(12) United States Patent
Nagarajan

(10) Patent No.: US 10,036,904 B1
(45) Date of Patent: Jul. 31, 2018

(54) METHOD AND SYSTEM FOR INTEGRATED DIFFERENTIAL ELECTRO-ABSORPTION MODULATOR DEVICE

(71) Applicant: INPHI CORPORATION, Santa Clara, CA (US)

(72) Inventor: Radhakrishnan L. Nagarajan, Santa Clara, CA (US)

(73) Assignee: INPHI CORPORATION, Santa Clara, CA (US)

( * ) Notice: Subject to any disclaimer, the term of this patent is extended or adjusted under 35 U.S.C. 154(b) by 181 days.

(21) Appl. No.: 14/226,713

(22) Filed: Mar. 26, 2014

(51) Int. Cl.
G02F 1/035 (2006.01)
G02F 1/025 (2006.01)

(52) U.S. Cl.
CPC .................... *G02F 1/025* (2013.01)

(58) Field of Classification Search
None
See application file for complete search history.

(56) References Cited

U.S. PATENT DOCUMENTS

| | | | |
|---|---|---|---|
| 5,933,265 A | 8/1999 | Nagarajan | |
| 7,058,263 B2 | 6/2006 | Welch et al. | |
| 7,236,656 B2 | 6/2007 | Welch et al. | |
| 7,340,127 B1* | 3/2008 | Chang | G01J 3/10 385/24 |
| 8,110,823 B2 | 2/2012 | Bowers | |
| 8,380,033 B1 | 2/2013 | Fang et al. | |
| 2003/0175037 A1* | 9/2003 | Kimmitt | G02F 1/0123 398/198 |
| 2009/0202196 A1* | 8/2009 | Kish, Jr. | B82Y 20/00 385/14 |
| 2009/0244857 A1* | 10/2009 | Tanaka | G02F 1/0123 361/748 |
| 2010/0289594 A1* | 11/2010 | Bostak | H03C 1/34 332/185 |
| 2011/0013907 A1* | 1/2011 | Sugihara | G02F 1/0123 398/38 |
| 2011/0074487 A1* | 3/2011 | Behnia | G02F 1/0121 327/355 |
| 2012/0183306 A1* | 7/2012 | Inoue | H04B 10/505 398/183 |
| 2012/0230626 A1* | 9/2012 | Metz | G02F 1/011 385/3 |
| 2015/0030339 A1* | 1/2015 | Margalit | H04B 10/506 398/183 |

\* cited by examiner

*Primary Examiner* — Chris Chu
(74) *Attorney, Agent, or Firm* — Richard T. Ogawa; Ogawa P.C.

(57) ABSTRACT

An integrated differential Electro-Absorption Modulator (EAM) device. The device includes a substrate, an electrical driver, and two EAM modules. The electrical driver circuit is configured overlying the substrate member and has one output electrically coupled to the first EAM module and the other output electrically coupled to the second EAM module. The first and second EAM modules have a first and a second output, respectively. A beam splitter can be configured to split an optical input into two optical outputs, each of which can be optically coupled to the optical inputs of the first and second EAM modules.

20 Claims, 22 Drawing Sheets

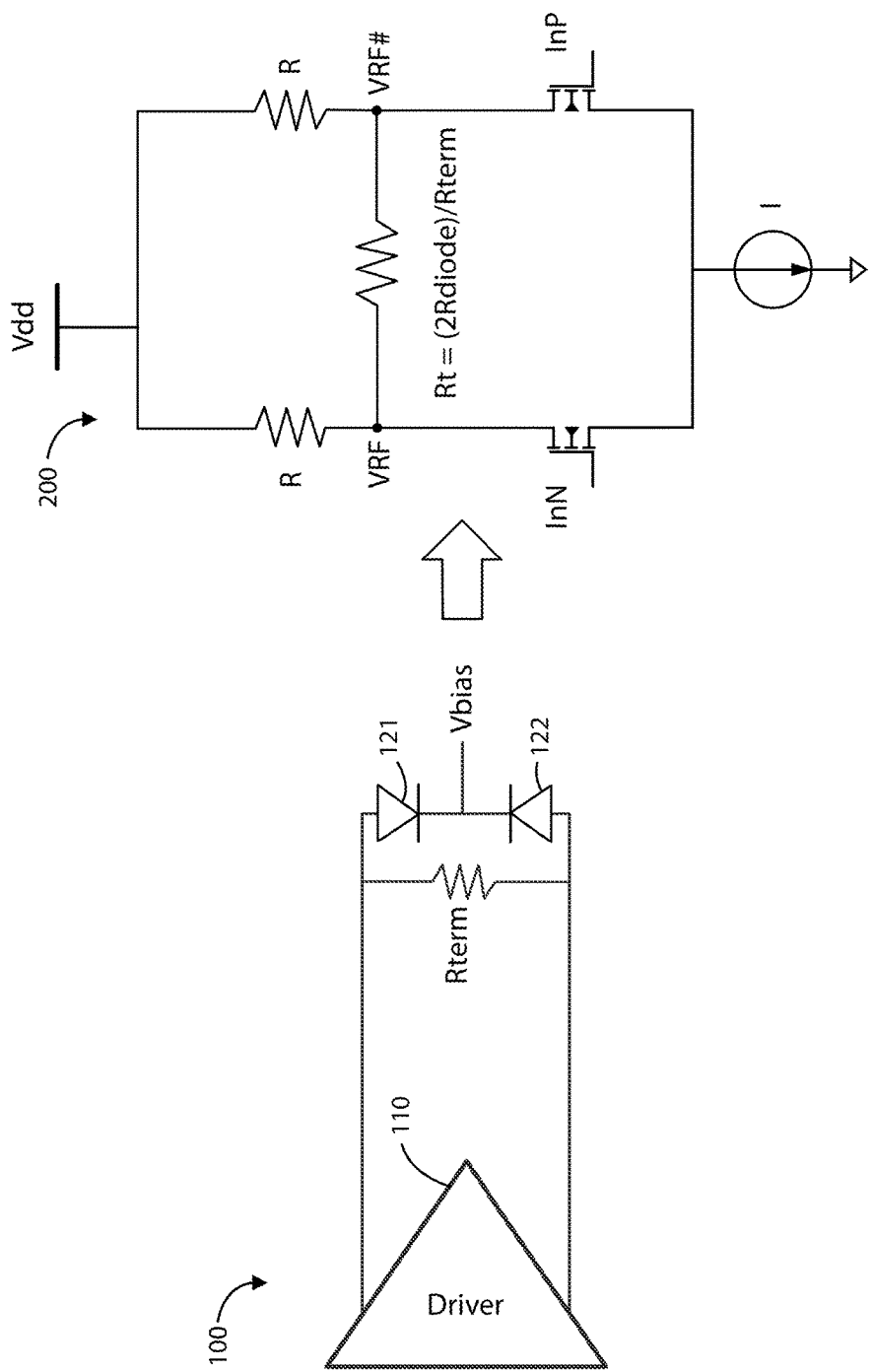

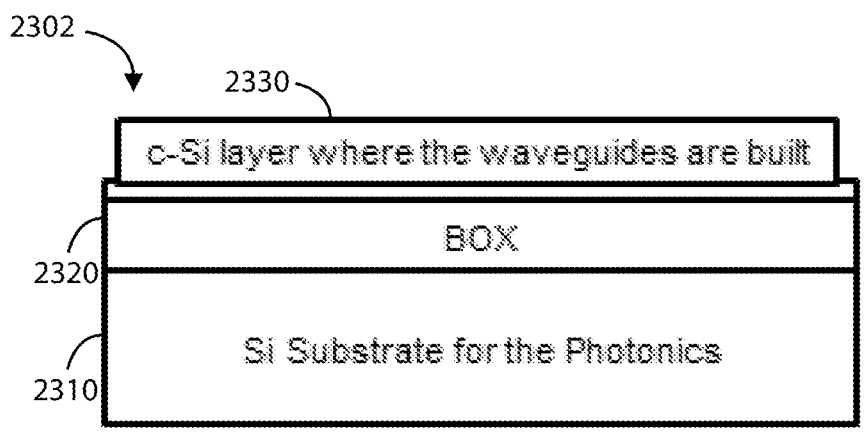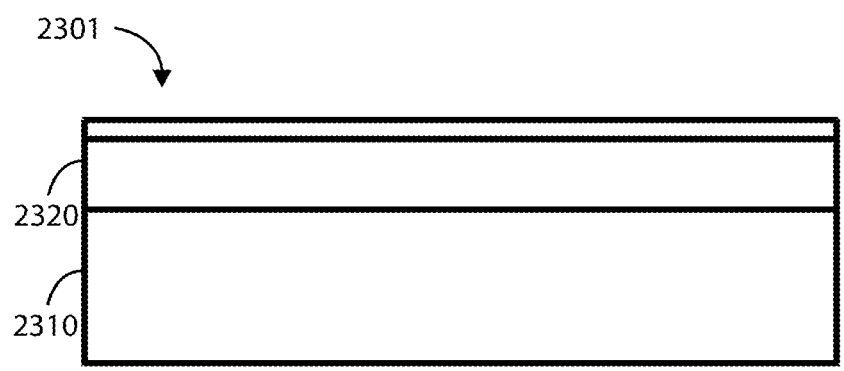
FIGURE 23

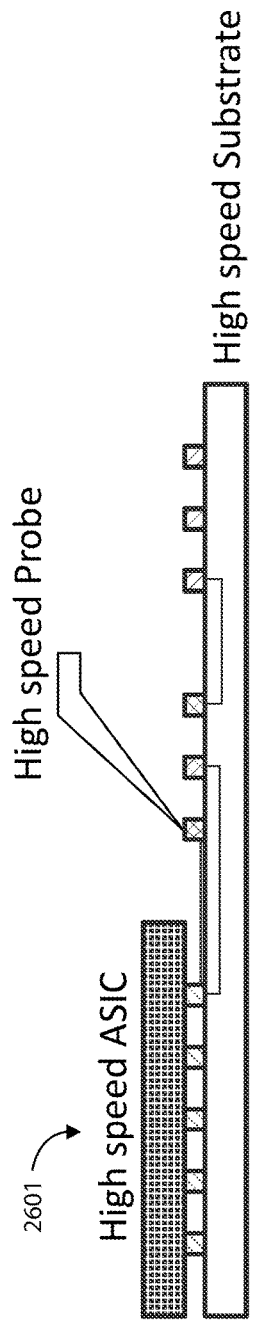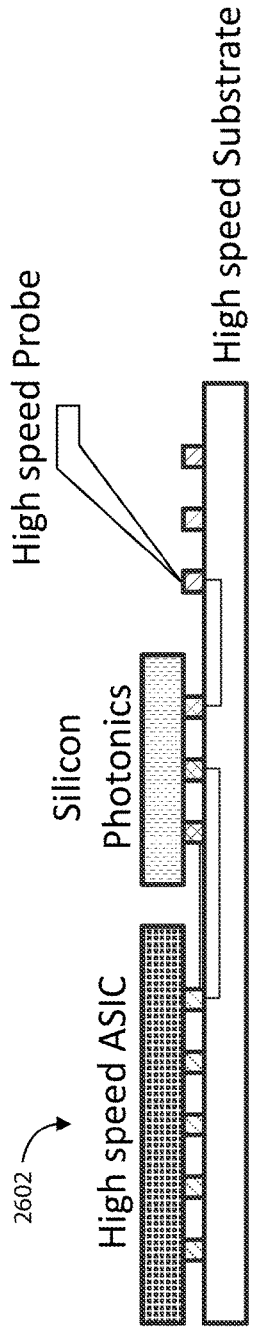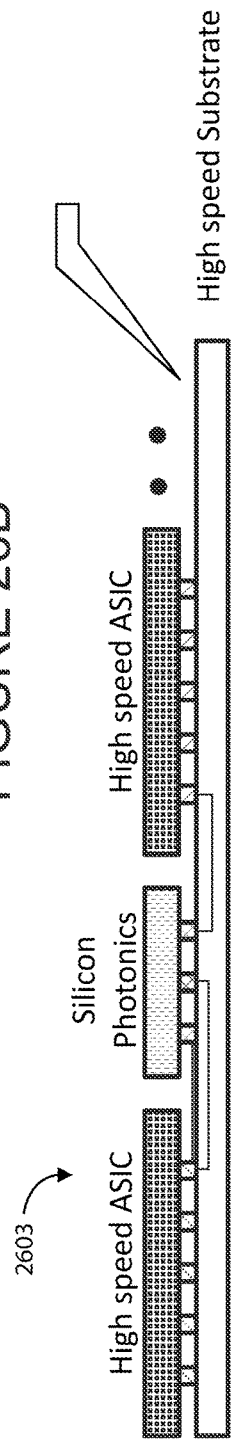

METHOD AND SYSTEM FOR INTEGRATED DIFFERENTIAL ELECTRO-ABSORPTION MODULATOR DEVICE

CROSS-REFERENCE TO RELATED APPLICATIONS

N/A

BACKGROUND OF THE INVENTION

The present invention relates to telecommunication techniques and integrated circuit (IC) devices. More specifically, various embodiments of the present invention provide an integrated differential Electro-Absorption Modulator (EAM) device. The modulator device can include an electrical driver circuit configured overlying a substrate member and coupled to a first and second EAM module. These EAM modules can be coupled to a common mode termination resistor, a beam splitter module, and a bias circuit. Furthermore, the differential EAM device can be coupled within a communication interface configured to transfer data at high bandwidth over optical communication networks.

Over the last few decades, the use of communication networks has exploded. In the early days of the Internet, popular applications were limited to emails, bulletin board, and mostly informational and text-based web page surfing, and the amount of data transferred was relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

CMOS technology is commonly used to design communication systems implementing Optical Fiber Links. As CMOS technology is scaled down to make circuits and systems run at higher speed and occupy smaller chip (die) area, the operating supply voltage is reduced for lower power consumption. Conventional FET transistors in deep-submicron CMOS processes have very low breakdown voltage as a result the operating supply voltage is maintained around 1 Volt. The Photo-detectors (PD) used in 28G and 10G Optical Receivers require a bias voltage of more than 2 Volts across the anode and cathode nodes of the PD for better photo-current responsivity. These limitations provide significant challenges to the continued improvement of communication systems scaling and performance.

There have been many types of communication systems and methods. Unfortunately, they have been inadequate for various applications. Therefore, improved communication systems and methods are desired.

BRIEF SUMMARY OF THE INVENTION

The present invention relates to telecommunication techniques and integrated circuit (IC) devices. More specifically, various embodiments of the present invention provide an integrated differential Electro-Absorption Modulator (EAM) device. The modulator device can include an electrical driver circuit configured overlying a substrate member and coupled to a first and second EAM module. These EAM modules can be coupled to a common mode termination resistor, a beam splitter module, and a bias circuit. Furthermore, the differential EAM device can be coupled within a communication interface configured to transfer data at high bandwidth over optical communication networks.

The driver circuit can include a differential low-voltage driver circuit, which can be coupled to an internal Vdd, power supply, or the like. In an embodiment, the driver circuit can have a first and second output. The first output can be coupled to a first transmission line, which is characterized by a first impedance. The second output can be coupled to a second transmission line, which is characterized by a second impedance.

The differential nature of the driver allows the ability to produce larger drive voltages, which provide balance for better signal integrity at the driver, transmission lines, and on the diode load. The termination resistor can be configured to reduce signal reflections without affecting the configuration of the first and second EAM modules. In a specific embodiment, the first impedance can be predetermined as a data line impedance, which can be the same as the second impedance. In various embodiments, the impedances of these transmission lines can be configured as symmetrical or asymmetrical depending on the application.

The first EAM module can be coupled to the first transmission line and a bias line and the second EAM module can be coupled to the second transmission line and the bias line. In a specific embodiment, each of the EAM modules can include a photodiode. The first diode can have a first anode terminal coupled to the first transmission line and a first cathode terminal coupled to the bias line. The second diode can have a second anode terminal coupled to the second transmission line and a cathode terminal coupled to bias line. These diodes can be reverse-biased modulator diodes configured as an electro-optical modulator (EOM) or an electro-absorption modulator (EAM), or the like.

Many benefits are recognized through various embodiments of the present invention. Such benefits include having a beneficial configuration for RF layouts. Embodiments of this configuration also allows a faster driver transistor with lower breakdown voltage to directly apply the data signals, while the necessary DC bias can be generated by a slower, higher breakdown voltage transistor. Embodiments of the driver circuit can be fully integrated in a nanoscale CMOS process using fast low-V and slow high-V devices to maximize these advantages. The driver can also be directly coupled to modulators on a photonic IC without the need for external passive components other than patterned metal lines. Other benefits will be recognized by those of ordinary skill in the art that the mechanisms described can be applied to other communications systems as well.

The present invention achieves these benefits and others in the context of known data transmission and memory technologies. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

FIG. 1 is a simplified diagram of a differential driver circuit according to an embodiment of the present invention.

FIG. 2 is a simplified diagram of a differential driver circuit according to an embodiment of the present invention.

FIG. 23 is a simplified diagram illustrating a hybrid light source for a silicon photonics device according to an embodiment of the present invention.

FIGS. 26 A-C are simplified diagrams illustrating a silicon photonics device configured on high speed substrates according to embodiments of the present invention.

DETAILED DESCRIPTION OF THE INVENTION

Figure 3:
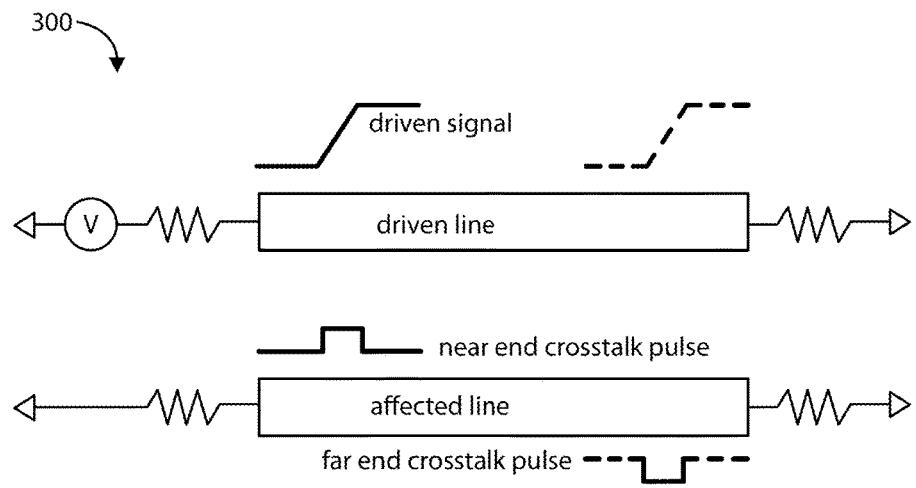
FIG. 3 is a simplified diagram illustrating an example of a driven line inducing crosstalk signals in an affected line.

The present invention relates to telecommunication techniques and integrated circuit (IC) devices. More specifically, various embodiments of the present invention provide an integrated differential Electro-Absorption Modulator (EAM) device. The modulator device can include an electrical driver circuit configured overlying a substrate member and coupled to a first and second EAM module. These EAM modules can be coupled to a common mode termination resistor, a beam splitter module, and a bias circuit. Furthermore, the differential EAM device can be coupled within a communication interface configured to transfer data at high bandwidth over optical communication networks.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

In an embodiment, the present invention provides an electro-optical modulator configured to allow a low voltage driver to directly drive an optical modulator device having a high voltage bias applied. The present configuration can provide this signal driving operation without compromise to bandwidth or signal integrity and without the need for external capacitors or inductors in the form of bias T's. The low voltage driver can apply a high-speed data signal across modulator diodes of the optical modulator device independent of a DC bias voltage, which is generally much higher than the data signal voltage.

FIG. 1 is a simplified diagram of a differential driver circuit according to an embodiment of the present invention. As shown, device 100 includes a driver 110 coupled to a first diode 121 and a second diode 122. A termination resistor Rterm and a DC bias voltage Vbias are both coupled to the first and second diodes 121, 122. In a specific embodiment, each of the diodes can have an anode terminal and a cathode terminal. Both cathode terminals can be coupled to the bias voltage, while both anode terminals can be coupled to the termination resistor. The diodes 121, 122 can include photodiodes, Electro-Absorption Modulator (EAM) modules, or the like. These diodes can include indium phosphide materials and can be configured within a silicon photonics device.

FIG. 2 is a simplified diagram of a differential driver circuit according to an embodiment of the present invention. Device 200 shows an equivalent circuit of device 100 shown in FIG. 1. The differential inputs of the driver are shown at InN and InP and the differential outputs are shown at VRF and VRF#. An equivalent resistor coupled to the differential outputs is shown as Rt. Those of ordinary skill in the art will recognize other variations, modifications, and alternatives.

FIG. 3 is a simplified diagram illustrating an example of a driven line inducing crosstalk signals in an affected line. In this example, the driven line is coupled to a voltage source and shows a driven signal at the near end as well as at the far end (dotted line). In the affected line, a near end crosstalk pulse is shown to be induced in response to the near end driven signal. A far end crosstalk pulse is shown to be induced in response to the far end driven signal.

Crosstalk can include mutual inductance, which will induce a current opposite of the driving current in the affected line, and mutual capacitance, which will pass current that flows in both directions on the affected line. Here, only one line is driven. However, further effects of crosstalk will occur with two driven lines, either with both lines driven in phase (even mode) or with the lines driven in 180 degrees out of phase (odd mode). In the case of driving the two lines out of phase as in the case of a differential drive, you minimize crosstalk.

Figure 4:
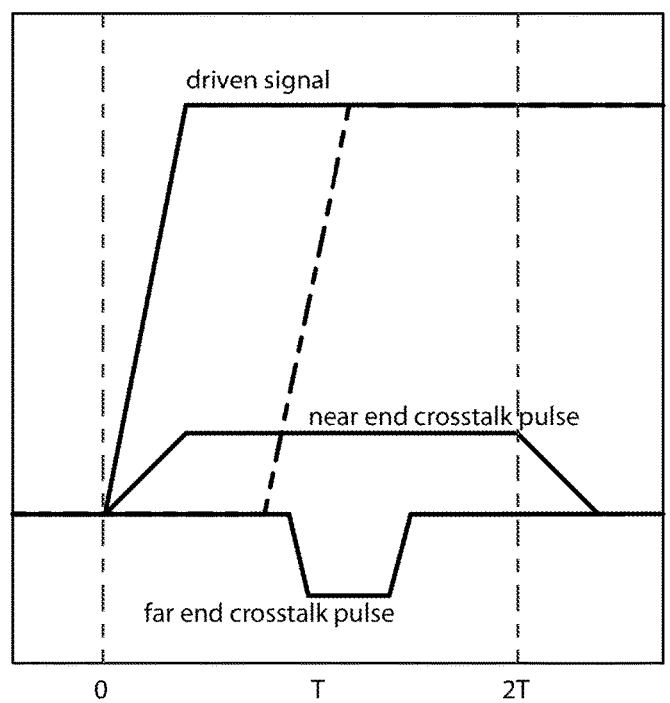
FIG. 4 is a simplified graph illustrating the driven signal and induced crosstalk signals of the configuration shown in FIG. 3.

FIG. 4 is a simplified graph illustrating the driven signal and induced crosstalk signals of the configuration shown in FIG. 3. Graph 400 shows the driven signals and the crosstalk pulses over an arbitrary 2T time period. Crosstalk signals are induced on the rising and falling edges of the driven signal. As shown, the rising edge of the driven signal begins at time=0. This rising edge also triggers the near end crosstalk pulse, which is characterized by a positive voltage. The rising edge of the far end driven signal (dotted line) triggers the far end crosstalk pulse, which is characterized by a negative voltage, but can be positive as well. Those of ordinary skill in the art will recognize variations of these crosstalk characteristics.

Electro-Absorption Modulator devices are inherently singled ended drive devices, which is a disadvantage in terms of vulnerability to the effects of crosstalk. Having two single ended devices can result in crosstalk pulses, such as described for FIGS. 3 and 4. Embodiments of the present invention include a differentially configured EAM device, which utilizes a differential electrical driver circuit coupled to two single ended EAM modules. By using a beam splitter, this configuration can effectively transform the single ended EAM modules into a differential EAM device. Running these signals differentially can mitigate the issues that arise from crosstalk, which particularly becomes an issue with driving multiple channels and high speeds (>10 Gbit/s) and having very closely spaced high density drivers (order of 3 or 4).

Figure 5:
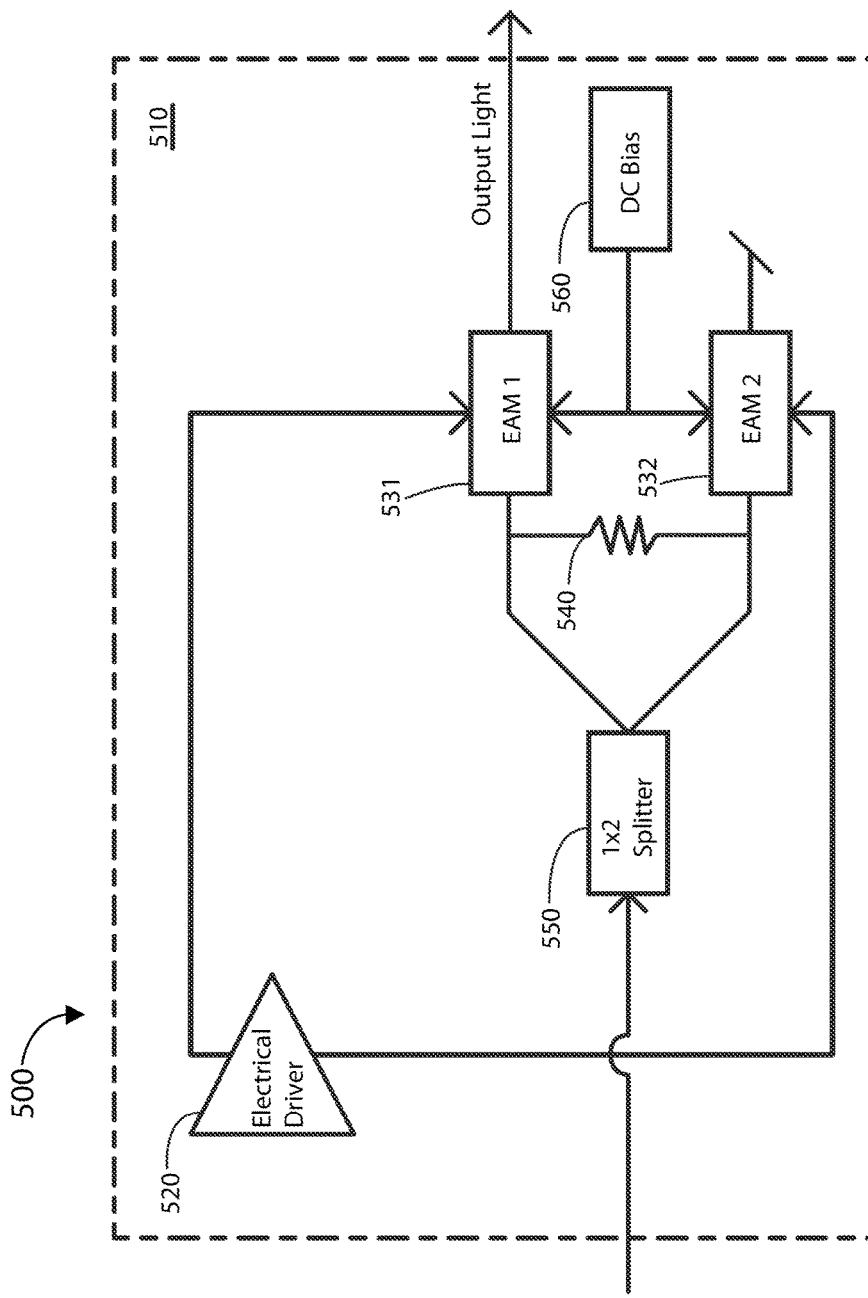
FIG. 5 is a simplified diagram of an integrated differential EAM device according to an embodiment of the present invention.

FIG. 5 is a simplified diagram of an integrated differential EAM device according to an embodiment of the present invention. As shown, device 500 includes a substrate 510, an electrical driver 520, and two EAM modules 531 and 532. The electrical driver circuit 520 is configured overlying the substrate member 510 and has one output electrically coupled to the first EAM module 531 and the other output electrically coupled to the second EAM module. The first and second EAM modules 531, 532 have a first and a second output, respectively. A beam splitter 550 can be configured to split an optical input into two optical outputs, each of which can be optically coupled to the optical inputs of the first and second EAM modules. In various embodiments, the beam splitter 550 can be excluded, which may not exhibit the same balance of the former configuration, but will not waste half of the optical signal.

A common mode termination resistor 540 and a DC bias 560 can be coupled to the EAM modules. In a specific embodiment, the device 500 can include a common mode voltage node coupled between the first and second EAM modules. The substrate member of device 500 can include a PTFE (polytetrafluoroethylene) material, a fiberglass material, a resin material, an epoxy material, a woven material, a composite material, or the like and combinations thereof. In a specific embodiment, the devices which are fabricated on a InP or Si substrate can then be assembled on a non-conducting polymer substrate. In these cases, they cannot be fabricated on a polymer substrate. More specifically, the substrate member can utilize materials from high speed substrates such as Rogers laminate, Megtron-6, FR-4, or the like.

In an embodiment, the second output of the second EAM module 532 can be configured as a monitor, a complementary output, or can be terminated. In a specific embodiment, the first or second output can be characterized by a data rate of greater than 10 Gbit/s, a frequency range between 10 GHz-50 GHz, and a wavelength (λ) range between 1200 nm-1650 nm. Also, the first and second EAM modules 531, 532 can be configured as a matched pair. Each module of the matched pair can be configured with a match range of −25% to +25% (with respect to resistance, capacitance, etc.).

In a specific embodiment, the present invention can include a multiple differential EAM device, which can include a substrate member and at least two differential EAM modules. Each of the differential EAM modules can comprise a device such as device 500 shown in FIG. 5. Each of these devices can include a differential electrical driver device configured overlying the substrate member and having a first driver output and second driver output. A first EAM module having a first output can be electrically coupled to the first driver output of the driver circuit. A second EAM module having a second output can be electrically coupled to the second driver output of the driver circuit. Similar to device 500, a common mode termination resistor, a beam splitter module, and a bias circuit can be coupled to the first and second EAM modules. Furthermore, the first or second output of at least one of the differential EAM modules can be characterized by a wavelength (λ)

range between 1200 nm-1400 nm, and the first output or the second output of at least another of the differential EAM modules is characterized by a wavelength (A) range between 1500 nm-1650 nm. In a specific embodiment, the modules can have a restricted wavelength range, but both of them must have the same wavelength range of operation.

Depending on the application, one or more of these differential EAM modules can be configured in parallel or within an integrated communications system or interface. In an embodiment, the EAM module can be coupled to a driver interface and can be operably coupled to a silicon photonics device. In other embodiments, the differential EAM device described can include portions configured within an ASIC device as well as a Silicon Photonics device. Further details regarding the communications interface are described in the following figures.

In the last decades, with advent of cloud computing and data center, the needs for network servers have evolved. For example, the three-level configuration that have been used for a long time is no longer adequate or suitable, as distributed applications require flatter network architectures, where server virtualization that allows servers to operate in parallel. For example, multiple servers can be used together to perform a requested task. For multiple servers to work in parallel, it is often imperative for them to be share large amount of information among themselves quickly, as opposed to having data going back forth through multiple layers of network architecture (e.g., network switches, etc.).

Leaf-spine type of network architecture is provided to better allow servers to work in parallel and move data quickly among servers, offering high bandwidth and low latencies. Typically, a leaf-spine network architecture uses a top-of-rack switch that can directly access into server nodes and links back to a set of non-blocking spine switches that have enough bandwidth to allow for clusters of servers to be linked to one another and share large amount of data.

In a typical leaf-spine network today, gigabits of data are shared among servers. In certain network architectures, network servers on the same level have certain peer links for data sharing. Unfortunately, the bandwidth for this type of set up is often inadequate. It is to be appreciated that embodiments of the present invention utilizes PAM (e.g., PAM8, PAM12, PAM16, etc.) in leaf-spine architecture that allows large amount (up terabytes of data at the spine level) of data to be transferred via optical network.

Figure 6:
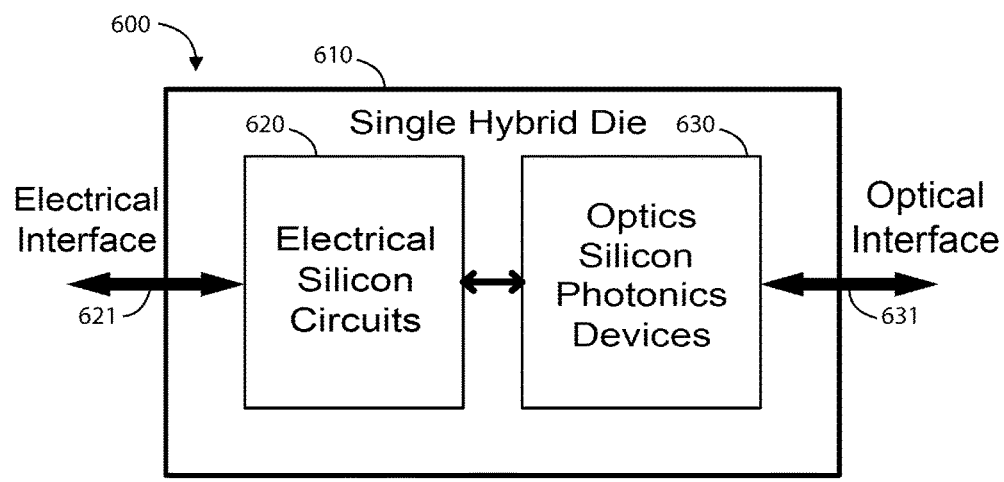
FIG. 6 is a simplified diagram of a single hybrid die (Both electrical and optics devices are fabricated on a single hybrid die) according to an embodiment of the present invention.

FIG. 6 is a simplified diagram of a single hybrid die (Both electrical and optics devices are fabricated on a single hybrid die) according to an embodiment of the present invention. In an example, the present device 600 comprises a single hybrid communication module made of silicon material. The module comprises a substrate member 610 having a surface region, an electrical silicon chip 620 overlying a first portion of the surface region, an silicon photonics device 630 overlying a second portion of the surface region, a communication bus coupled between the electrical silicon chip and the silicon photonics device, an optical interface 621 coupled to the silicon photonics device 630, and an electrical interface 621 coupled to the electrical silicon die 620.

Figure 7:
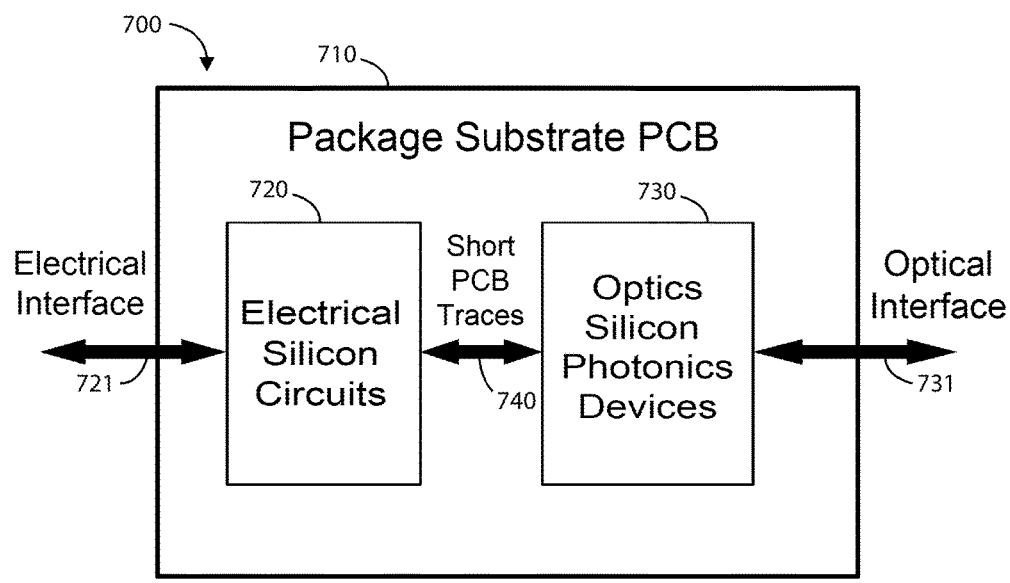
FIG. 7 is a simplified diagram of a multi-chip module according to an embodiment of the present invention.

FIG. 7 is a simplified diagram of a multi-chip module according to an embodiment of the present invention. In an example, the present device 700 comprises a single hybrid communication module. The module comprises a substrate member 710 having a surface region, which can be a printed circuit board or other member. The module comprises an electrical silicon chip 720 overlying a first portion of the surface region, a silicon photonics 730 device overlying a second portion of the surface region, a communication bus 740 coupled between the electrical silicon chip and the silicon photonics device, an optical interface 731 coupled to the silicon photonics device 730, and an electrical interface 721 coupled to the electrical silicon die 720.

Figure 8:
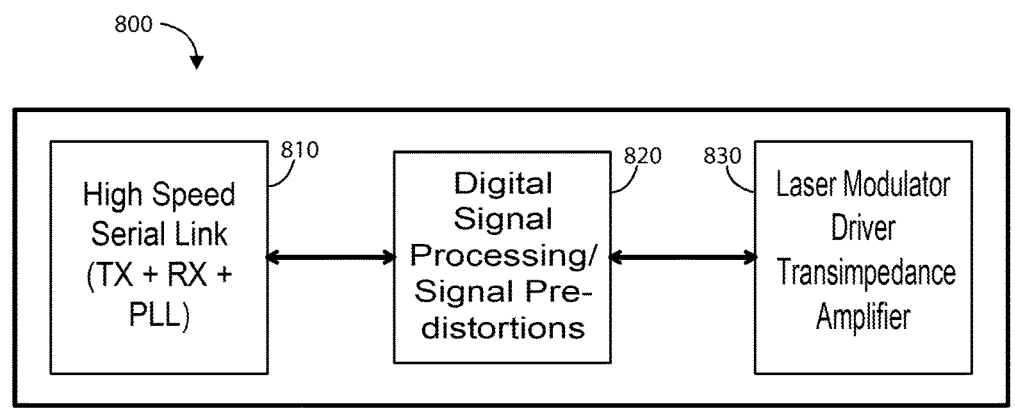
FIG. 8 is a simplified diagram of an electrical silicon die block according to an embodiment of the present invention.

FIG. 8 is a simplified diagram of an electrical silicon die block according to an embodiment of the present invention. As shown, the present device 800 can include a high speed serial link block 810, a digital signal processing/signal pre-distortion block 820, and a laser modulator driver transimpedance amplifier (TIA) 830, or other like devices. In an embodiment, the high speed serial link can include TX line, RX line, and PLL (Phase-Locked Loop) implementations. The serial link block 810 can be coupled to the signal processing module 820, which can be coupled to transimpedance amplifier 830.

Figure 9:
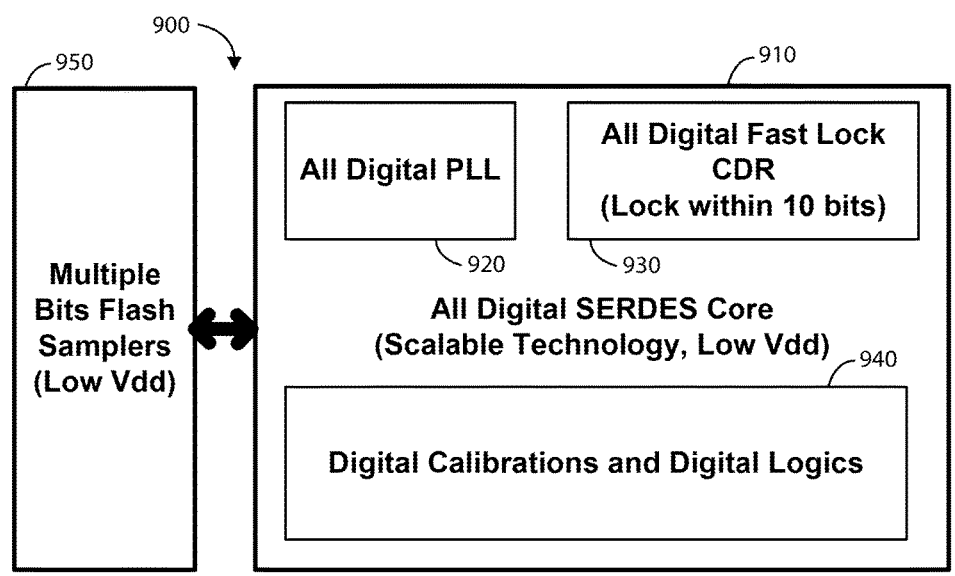
FIG. 9 is a simplified diagram of high speed serial link block according to an embodiment of the present invention.

FIG. 9 is a simplified diagram of high speed serial link block according to an embodiment of the present invention. As shown, the serial link block 900 can include a core 910, which can be an all digital SERDES core. The core 910 can include an all digital PLL 920, and all digital fast lock CDR 930 (Lock within 10 bits), and a digital calibrations and digital logics block 940. The core 910 can be coupled to multiple bits flash samplers 950. In a specific embodiment, the serial link block 810 of FIG. 8 can be configured like block 900.

Figure 10:
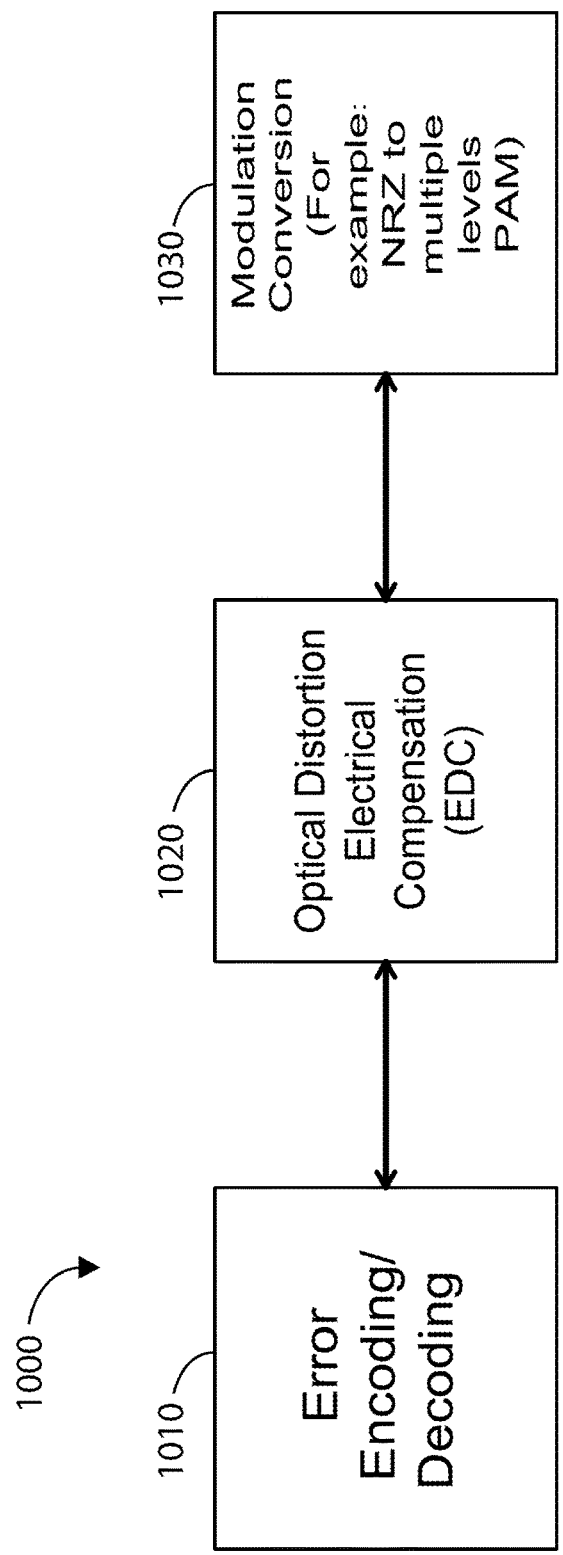
FIG. 10 is a simplified diagram of a digital processing/signal pre-distortion block according to an embodiment of the present invention.

FIG. 10 is a simplified diagram of a digital processing/signal pre-distortion block according to an embodiment of the present invention. As shown, the digital processing/signal pre-distortion block 1000 can include an error encoding/decoding block 1010, an optical distortion electrical compensation (EDC) block 1020, and a modulation conversion block 1030. In an embodiment, the encoding/decoding block 1010 can be coupled to the EDC block 1020, which is coupled to the modulation conversion block 1030. In a specific embodiment, the modulation conversion block 1030 can be configured to convert NRZ to multiple levels PAM.

The TIA block 830 of FIG. 8 can be configured like block 1000.

Figure 11:
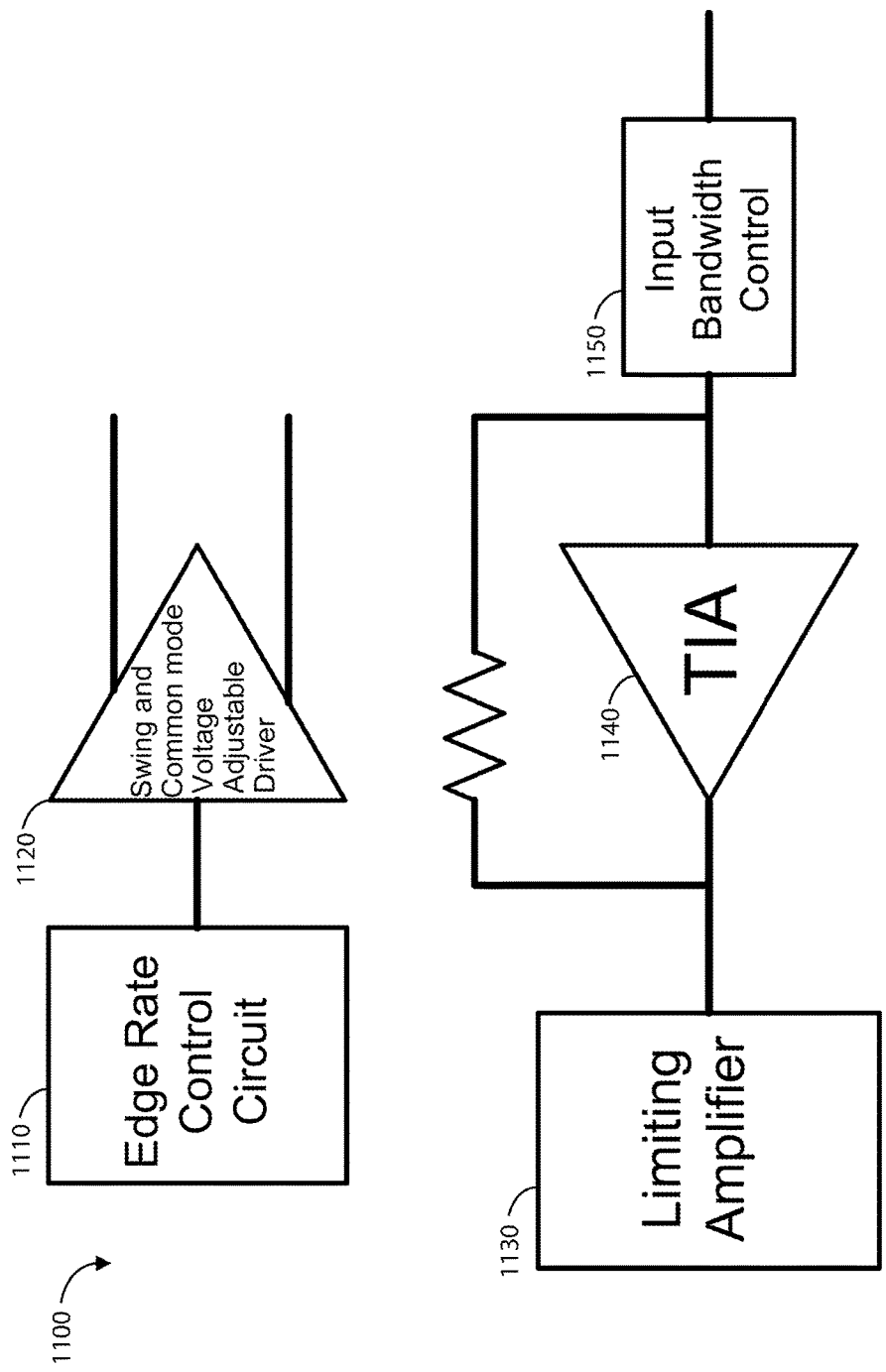
FIG. 11 is a simplified diagram of an electrical laser driver and TIA block diagram according to an embodiment of the present invention.

FIG. 11 is a simplified diagram of an electrical laser driver and TIA block diagram according to an embodiment of the present invention. As shown, the laser driver and TIA block 1100 can include an edge rate control circuit 1110 coupled to a swing and common mode voltage adjustable driver 1120. The driver and TIA block 1100 can also include a limiting amplifier 1130 coupled to a TIA 1140, which can be coupled to an input bandwidth control block 1150. Other configurations may be used as well.

Figure 12:
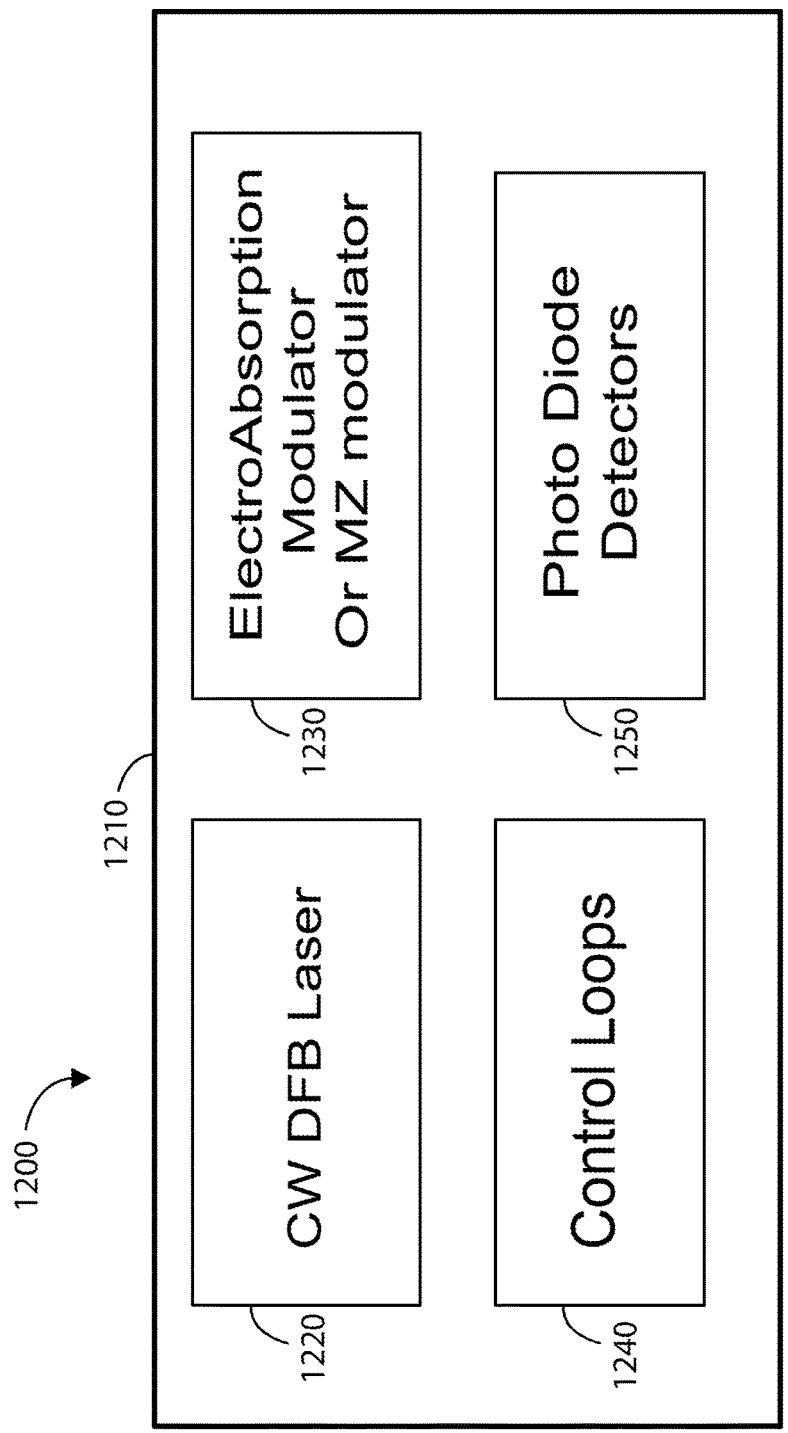
FIG. 12 is a simplified diagram of a silicon photonic block diagram according to an embodiment of the present invention.

FIG. 12 is a simplified diagram of a silicon photonic block diagram according to an embodiment of the present invention. As shown, the silicon photonics block 1200 can include a substrate 1210, a continuous wave (CW) distributed feedback (DFB) laser block 1220, an electro-absorption modulator or MZ modulator 1230, control loops 1240, and photo diode detectors 1250. Other variations, modifications, and alternatives will be recognized by those skilled in the art.

Figure 13:
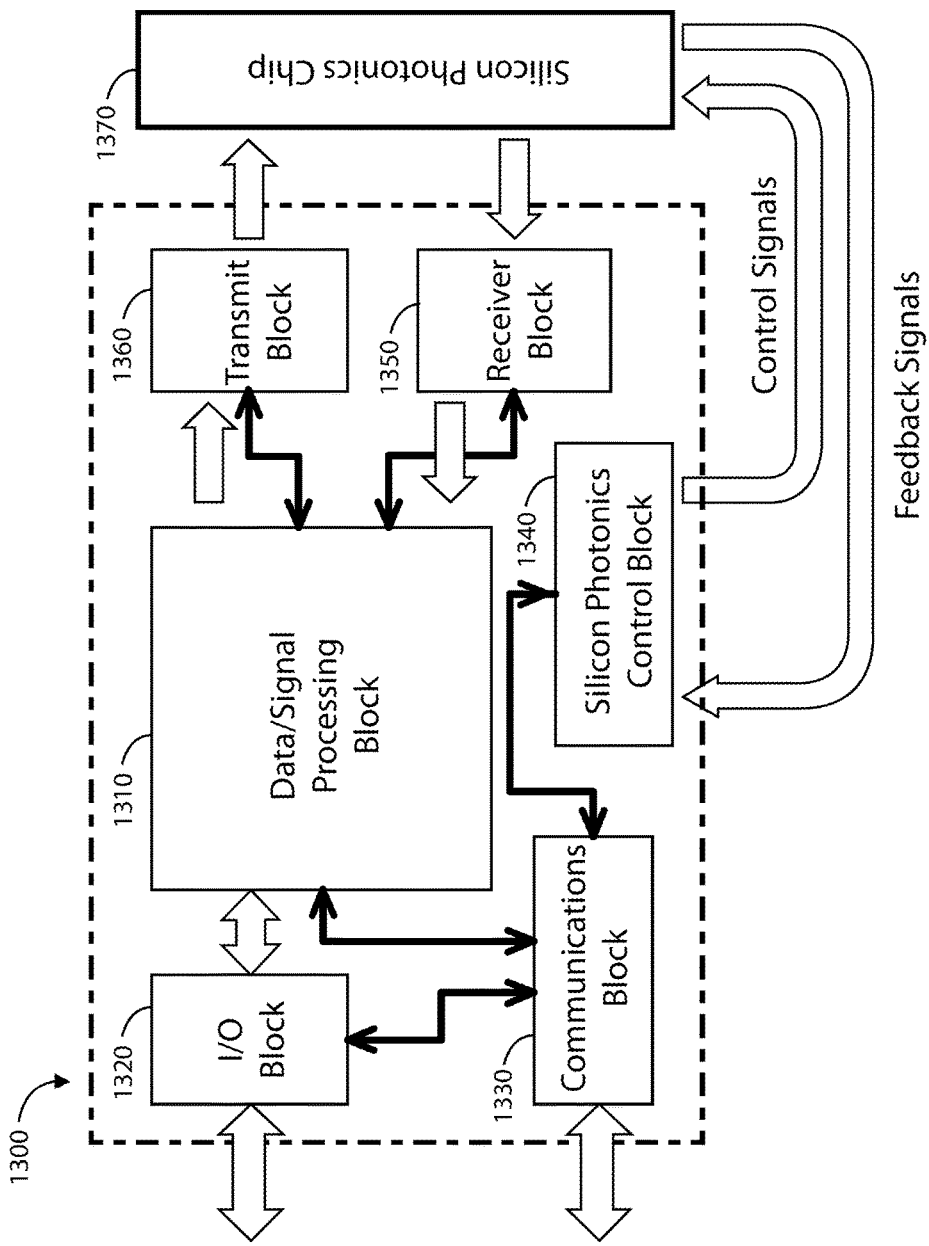
FIG. 13 is a simplified block diagram of a multi-chip module according to an alternative embodiment of the present invention.

FIG. 13 is a simplified block diagram of a multi-chip module according to an alternative embodiment of the present invention. As shown, the present invention includes an integrated system on chip device. The device 1300 is configured on a single silicon substrate member. The device has a data input/output interface provided on the substrate member and configured for a predefined data rate and protocol. The device has an input/output block 1320 provided on the substrate member and coupled to the data input/output interface. In an example, the input/output block 1320 comprises a SerDes block, a CDR block, a compensation block, and an equalizer block, among others. The device has a signal processing block 1310 provided on the substrate member and coupled to the input/output block 1320. In an example, the signal processing block 1310 is configured to the input/output block 1320 using a bi-direction bus in an intermediary protocol. The device has a driver module 1360 provided on the substrate member and coupled to the signal processing block. In an example, the driver module 1360 is coupled to the signal processing block 1310 using a uni-directional multi-lane bus. In an example, the device has a driver interface provided on the substrate member and coupled to the driver module 1360 and configured to be coupled to a silicon photonics device 1370. In an example, the driver interface is configured to transmit output data in either an amplitude modulation format or a combination of phase/amplitude modulation format or a phase modulation format. In an example, the device has a receiver module 1350 comprising a TIA block provided on the substrate member and to be coupled to the silicon photonics device 1370 using predefined modulation format, and configured to the digital signal processing block 1310 to communicate information to the input output block 1320 for transmission through the data input/output interface. In an example, the device has a communication block 1330 provided on the substrate member and operably coupled to the input/output block 1320, the digital signal processing block 1310, the driver block 1360, and the receiver block 1350, among others. The device has a communication interface coupled to the communication block 1330. The device has a control block 1340 provided on the substrate member and coupled to the communication block 1330.

In an example, the signal processing block 1310 comprises a FEC block, a digital signal processing block, a framing block, a protocol block, and a redundancy block, among others. The driver module 1360 is selected from a current drive or a voltage driver in an example. In an example, the driver module is a differential driver or the like. In an example, the silicon photonics device 1370 is selected from an electro absorption modulator or electro optic modulator, or a Mach-Zehnder. In an example, the amplified modulation format is selected from NRZ format or PAM format. In an example, the phase modulation format is selected from BPSK or nPSK. In an example, the phase/amplitude modulation is QAM. In an example, the silicon photonic device 1370 is configured to convert the output data into an output transport data in a WDM signal. In an example, the control block 1340 is configured to initiate a laser bias or a modulator bias. In an example, the control block 1340 is configured for laser bias and power control of the silicon photonics device. In an example, the control block 1340 is configured with a thermal tuning or carrier tuning device each of which is configured on the silicon photonics device. In an example, the SerDes block is configured to convert a first data stream of N into a second data stream of M.

Figure 14:
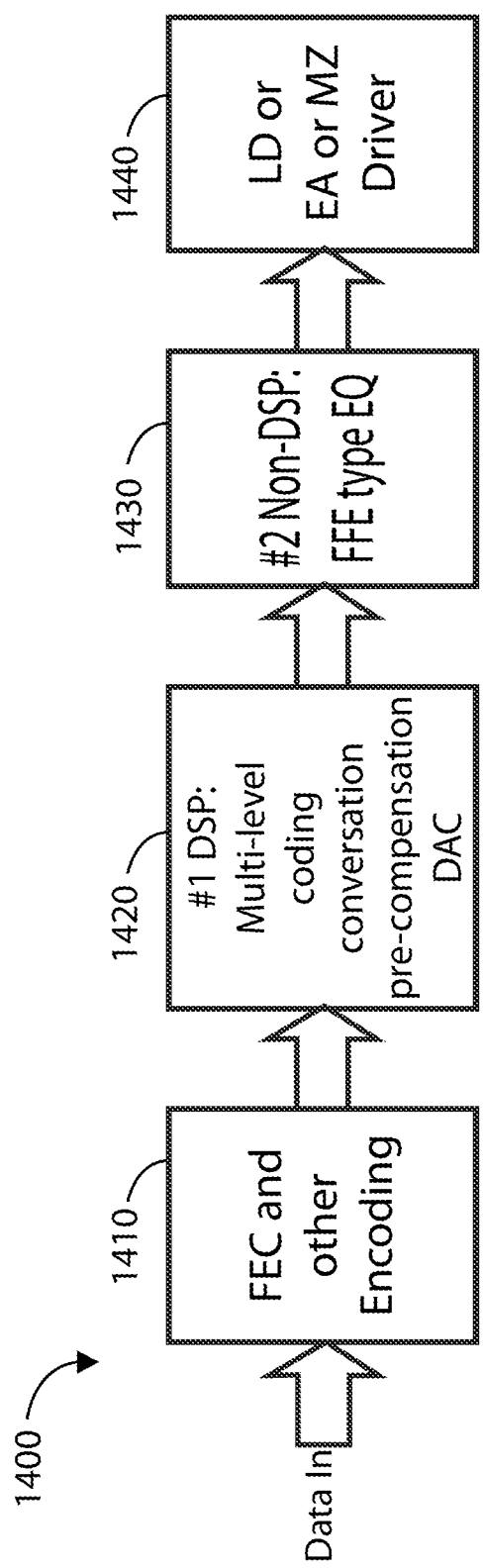
FIG. 14 is a simplified block diagram of data flow according to an embodiment of the present invention.

FIG. 14 is a simplified block diagram of data flow according to an embodiment of the present invention. As show is a stream of incoming data, which processed through multiple blocks. The blocks include, among others, forward error correction 1410, and other encoding, multi-level coding 1420, pre-compression, and digital to analog coding. The blocks also include non-DSP forward error correction 1430, and a block corresponding to a laser diode or driver 1440, among others. In an example, in the absence of a FEC from a host process, techniques include use an FEC internal to the CMOS chip. In an example, FEC can be striped across each or all of data lanes. Of course, there can be variations, modifications, and alternatives.

Figure 15:
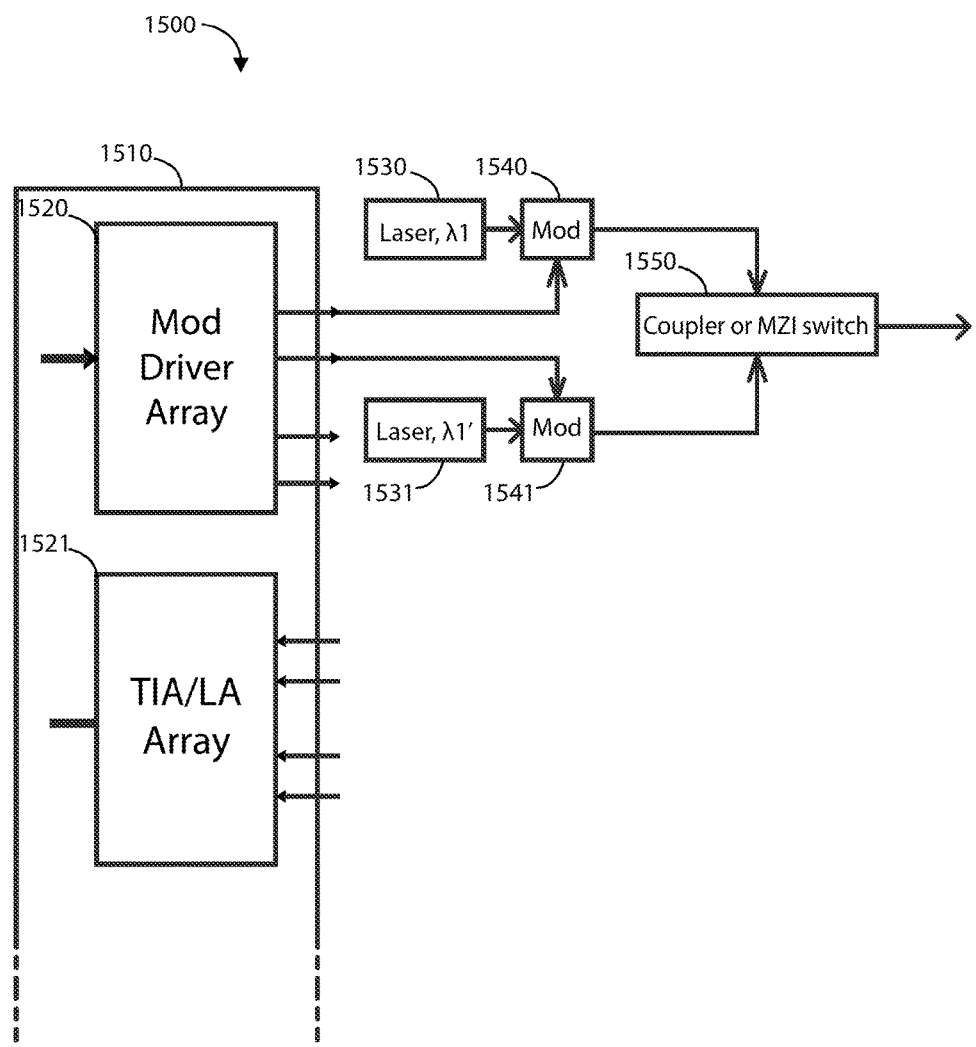
FIG. 15 is a simplified diagram illustrating a redundant laser configuration at a drive stage according to an embodiment of the present invention.

FIG. 15 is a simplified diagram illustrating a redundant laser configuration 1500 at a drive stage according to an embodiment of the present invention. In an example, the invention provides an integrated system on chip device 1510 having a redundant laser or lasers configured for each channel. The device 1510 can have a mod driver array 1520 and a TIA/LA array 1521. In an example, the device 1500 has a plurality of laser devices configured on the silicon photonics device. At least a pair of laser devices 1530, 1531 is associated with a channel and coupled to a switch 1550 to select one of the pair of laser devices to be coupled to an optical multiplexer to provide for a redundant laser device.

Figure 16:
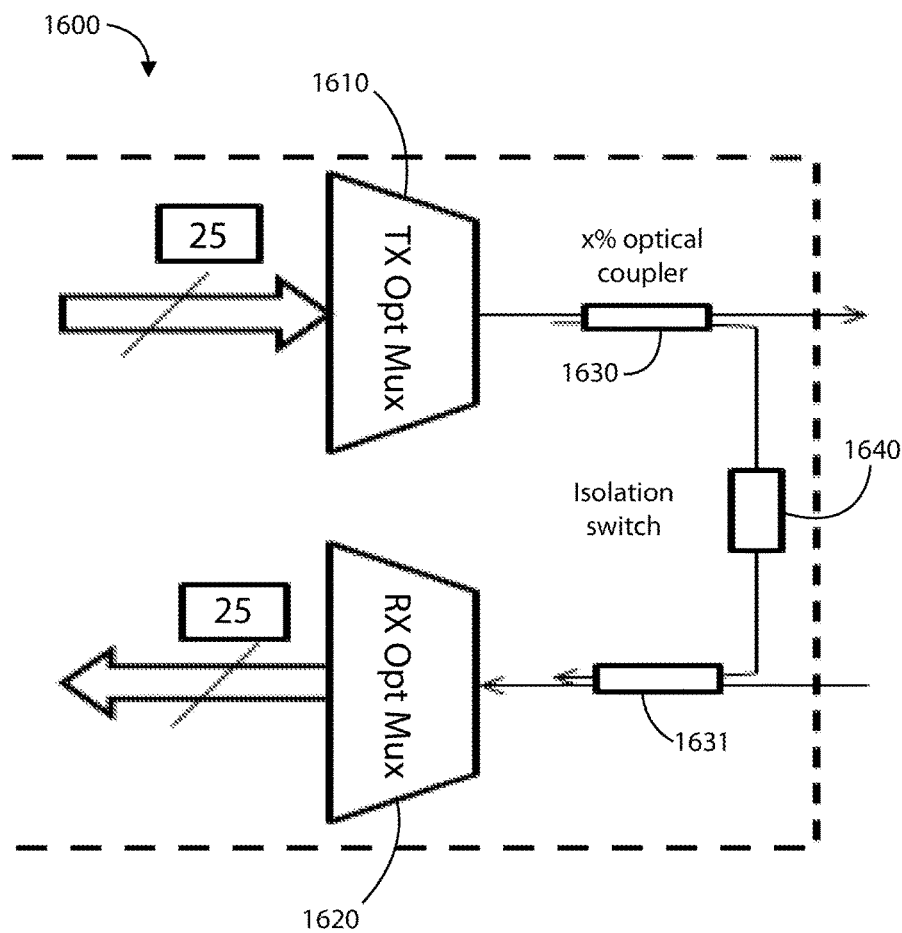
FIG. 16 is a simplified diagram illustrating a built-in self test using an optical loop back according to an embodiment of the present invention.

FIG. 16 is a simplified diagram illustrating a built-in self test using an optical loop back according to an embodiment of the present invention. As shown are a TX multiplexer 1610 and an RX multiplexer 1620 for a silicon photonics device. In an example, the present invention provides an integrated system on chip device having a self test using a loop back technique. In an example, the device has a self-test block provided on the substrate. In an example, the self test block is configured to receive a loop back signal from at least one of the digital signal processing block, the driver module, or the silicon photonics device. In an example, the self test block comprises a variable output power switch configured to provide a stress receiver test from the loop back signal. Also shown is an isolation switch 1640 between RX and TX. Optical couplers 1630 and 1631 are coupled to the TX Mux and RX Mux, respectively, as well as the isolation switch 1640.

In an example, the present technique allows a loop back test capability on the device, which is now a silicon photonic application specific integrated circuit or a communication system on chip device, as described. In an example, the technique is provided for diagnostic and setup during power up sequence. In an example, an optical tap coupler on the output side connected to the input side as shown. In an example as shown, x (e.g., <10%) is selected to reduce and/or minimize an impact an output power as well an impact at the input power given that input power is generally much lower than the output power. In an example, to prevent crosstalk in the present loop back path, an isolation switch has been configured as shown. In an example, without the isolation switch there is undesirably direct crosstalk between the output and input as shown. In an example, about 30 dB isolation is included to prevent deleterious effects of coherent crosstalk. Of course, there can be variations.

Figure 17:
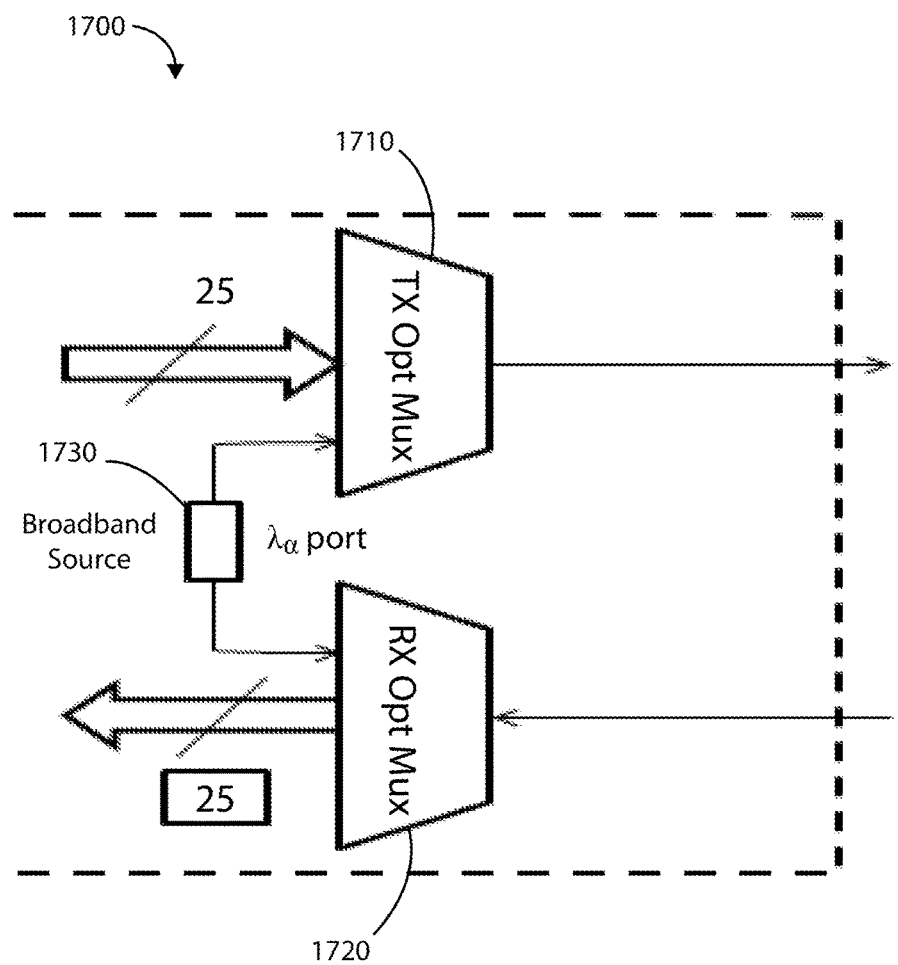
FIG. 17 is a simplified diagram illustrating a built-in self test configured for optical testing according to an embodiment of the present invention.

FIG. 17 is a simplified diagram illustrating a built-in self test configured for optical testing according to an embodiment of the present invention. In an example, the present invention provides an integrated system on chip device having a built-in self test technique. As shown are a TX multiplexer 1710 and an RX multiplexer 1720 for a silicon photonics device 1700. A broad band source 1730 is coupled to each of the multiplexers. Multiple sources can also be included. In an example, the device has a self test block configured on the silicon photonics device and to be operable during a test operation. In an example, the self test block comprises a broad band source configured to emit electromagnetic radiation from 1200 nm to 1400 nm or 1500 to 1600 nm to a multiplexer device. In an example, the broad band source 1730 can be an LED or other suitable device. The device also includes a self test output configured to a spectrum analyzer device external to the silicon photonics device. In an example, the technique can be provided during a calibration process. That is, if after calibration, a center λ of each multiplexer changed, the present technique including built-in light source will quantify or indicate the change in an example. In an example, the broadband source in silicon photonics is a light source with no optical feedback, although there can be variations.

Figure 18:
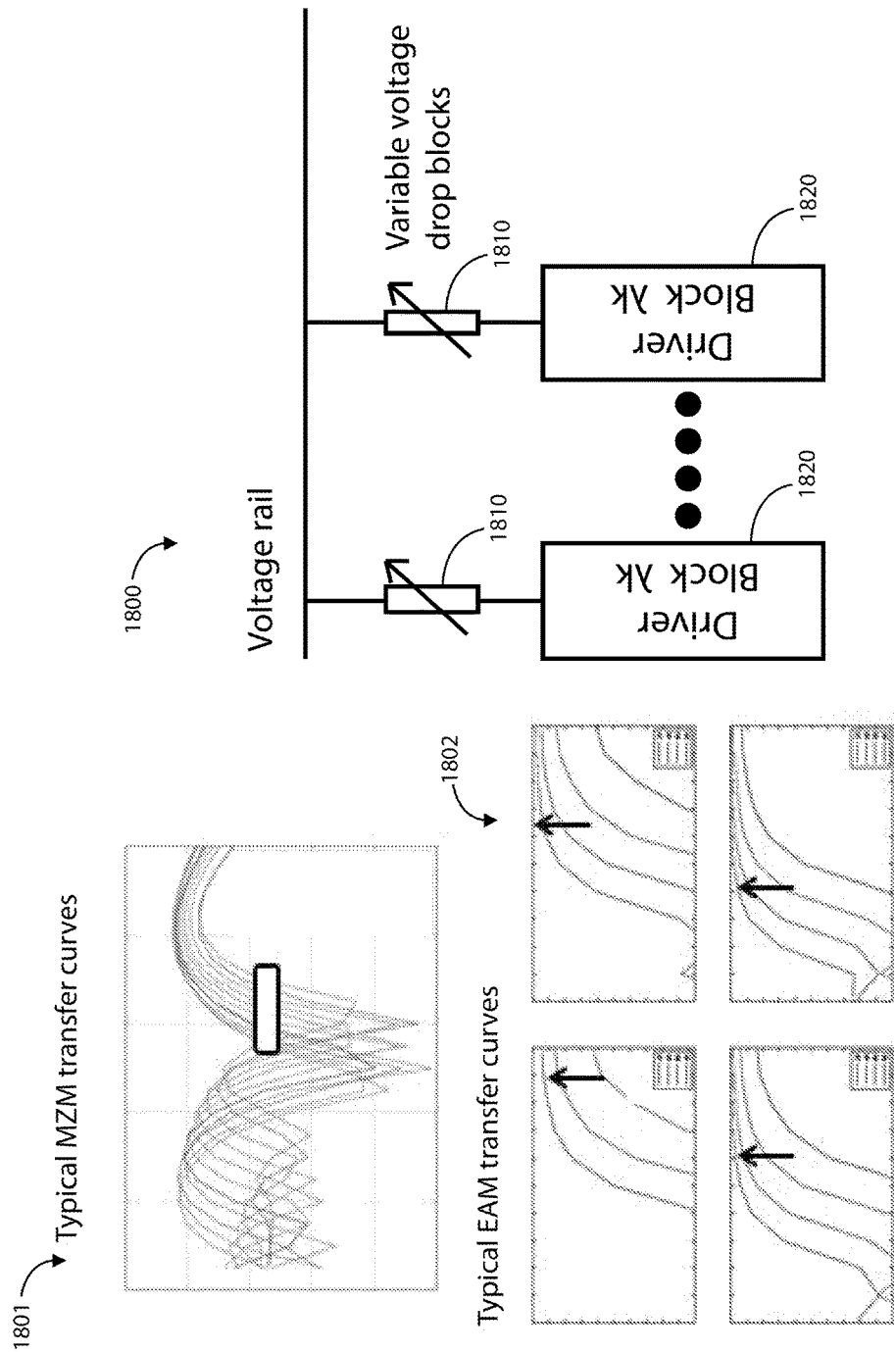
FIG. 18 is a simplified diagram illustrating a variable bias for optical elements configured within a silicon photonic device according to an embodiment of the present invention.

FIG. 18 is a simplified diagram illustrating a variable bias for optical elements configured in a silicon photonic device according to an embodiment of the present invention. As shown, graphs 1801 and 1802 are transfer curves provided for optical elements. In an example, the device as an integrated system on chip device having a capability selectively adjust each optical modulator to accommodate for fabrication tolerances, wavelength operation, and/or extinction ratio, among other parameters. The device has a single silicon substrate member and a data input/output interface provided on the substrate member and configured for a predefined data rate and protocol. In an example, the device has an input/output block provided on the substrate member and coupled to the data input/output interface. In an example, the input/output block comprises a SerDes block, a CDR block, a compensation block, and an equalizer block, among others. The device has a signal processing block provided on the substrate member and coupled to the input/output block. The signal processing block is configured to the input/output block using a bi-direction bus in an intermediary protocol. The device has a driver module provided on the substrate member and coupled to the signal processing block.

In an example, the driver module is coupled to the signal processing blocking using a uni-directional multi-lane bus. In an example, the device has a driver interface provided on the substrate member and coupled to the driver module and configured to be coupled to a silicon photonics device. In an example, the driver interface is configured to transmit output data in either an amplitude modulation format or a combination of phase/amplitude modulation format or a phase modulation format. In an example, the device has a receiver module comprising a TIA block provided on the substrate member and to be coupled to the silicon photonics device using predefined modulation format, and configured to the digital signal processing block to communicate information to the input output block for transmission through the data input/output interface. In an example, the device has a communication block provided on the substrate member and operably coupled to the input/output block, the digital signal processing block, the driver block, and the receiver block, and among others. The device has a communication interface coupled to the communication block and a control block provided on the substrate member and coupled to the communication block.

In an example, the device has a variable bias block configured with the control block. In an example, the variable bias block is configured to selectively tune each of a plurality of laser devices provided on the silicon photonics device to adjust for at least a wavelength of operation, a fabrication tolerance, and an extinction ratio. As shown is a plurality of driver blocks 1820. Each of the driver blocks 1820 is coupled to a voltage rail, and is configured with a variable voltage device 1810 to selectively tune each of the laser devices. In an example, each of the laser devices can be configured with an optical modulator(s) such as electro-absorption modulators, electro-optical modulators, among others, which often couple to a direct current power or bias. In an example, the DC bias is a function of wavelength of operation and also of fabrication tolerances, among other factors. In an example, the present bias circuitry accommodates and/or corrects for any bias variations, while desirably controlling power. Of course, there can be variations, modifications, and alternatives.

Figure 19:
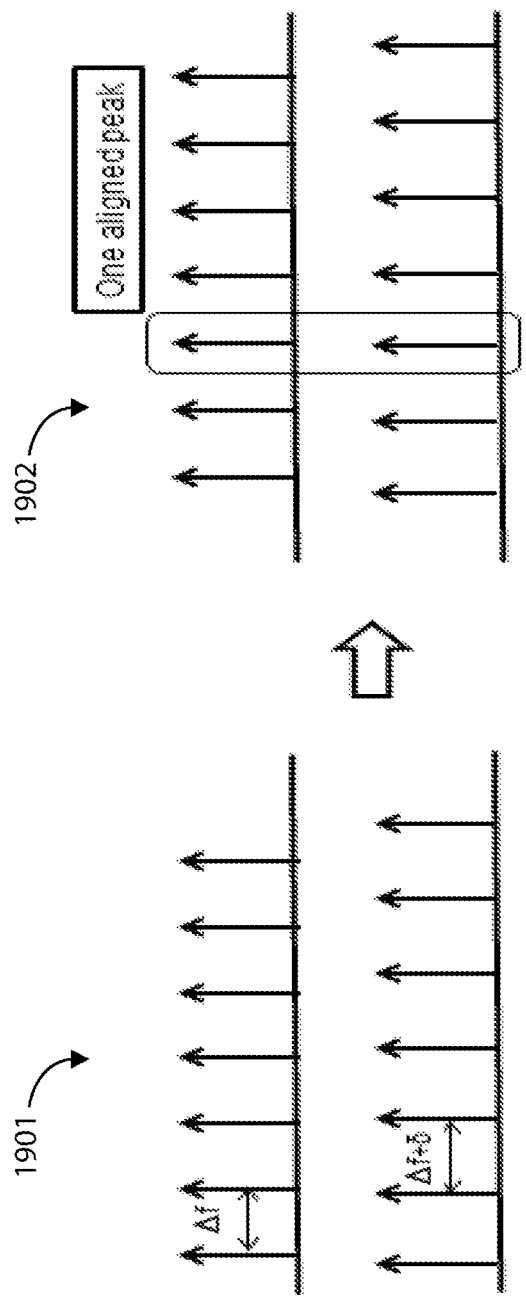
FIG. 19 is a simplified diagram illustrating wavelength tuning configured to silicon photonic device according to an embodiment of the present invention.

FIG. 19 is a simplified diagram illustrating wavelength tuning configured to silicon photonic device according to an embodiment of the present invention. In an example, the present tunable laser uses a set of rings or gratings with resonant frequencies that a slightly different. In an example, the technique use a vernier effect to tune the laser over a wide frequency range—limited by the bandwidth of the gain region. In an example, the vernier desirably would be held in lock with respect to one another. In an example, the technique uses a dither frequency on one of the biases (e.g., heater) and lock the ring to the maximum transmission of the second ring or grating, although there can be variations. As shown in graph 1901, resonant combs are generally misaligned in an example. When tuned, thermally or otherwise, techniques can be used to selectively align one of the combs to another comb or spatial reference as shown in graph 1902. In an example, to maintain alignment, the technique dithers the signal to one of the rings. Of course, there can be variations, alternatives, and modifications.

Figure 20:
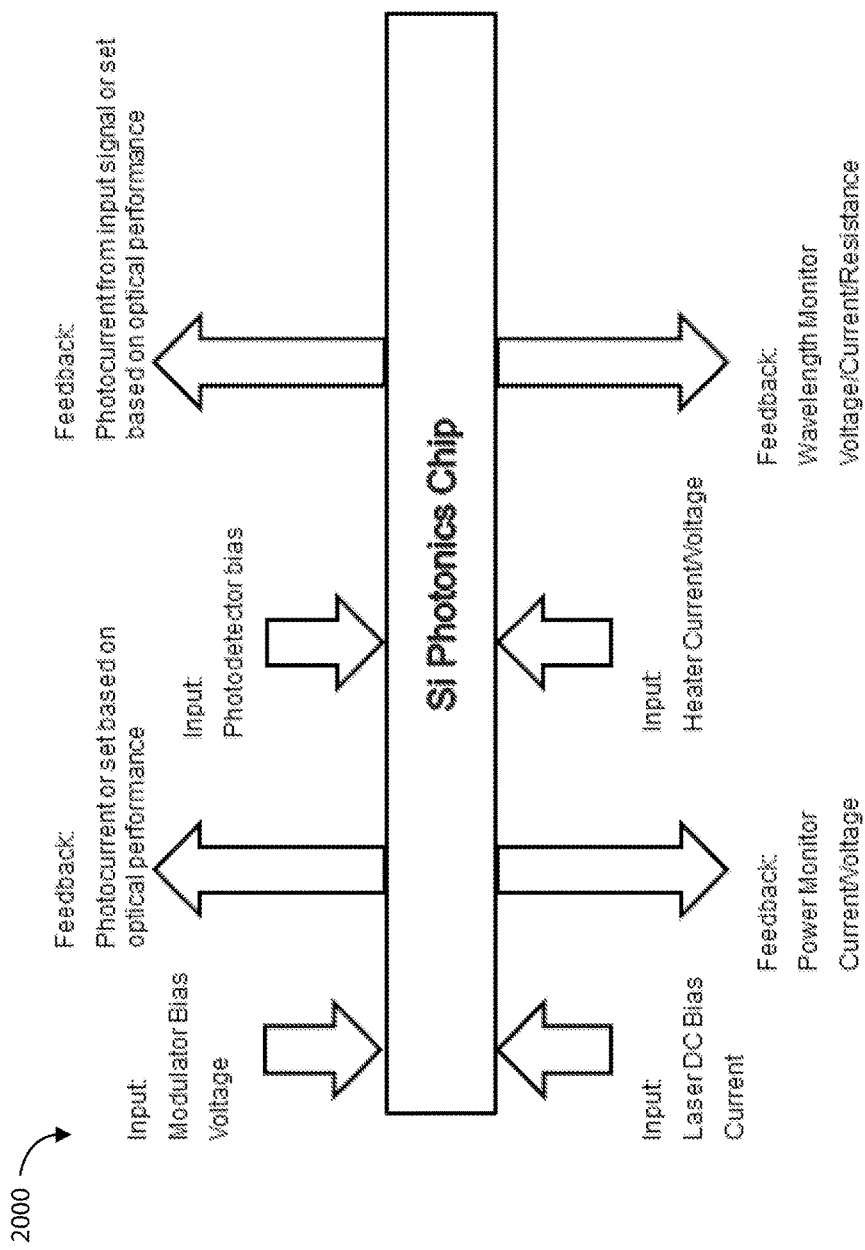
FIG. 20 is a simplified block diagram of an interface for a silicon photonics device according to an embodiment of the present invention.

FIG. 20 is a simplified block diagram of an interface for a silicon photonics device according to an embodiment of the present invention. In an example, the interface is provided to communicate between the control block and the silicon photonics device. The interface includes one or more of a modulator bias voltage input, a laser DC bias current input, a photocurrent or set output, a power monitor current/voltage output, a photodetector bias input, a heater current/voltage input, a photocurrent from input signal or set output, a wavelength monitor voltage/current/resistance output, among other elements. Of course, there can be variations.

Figure 21:
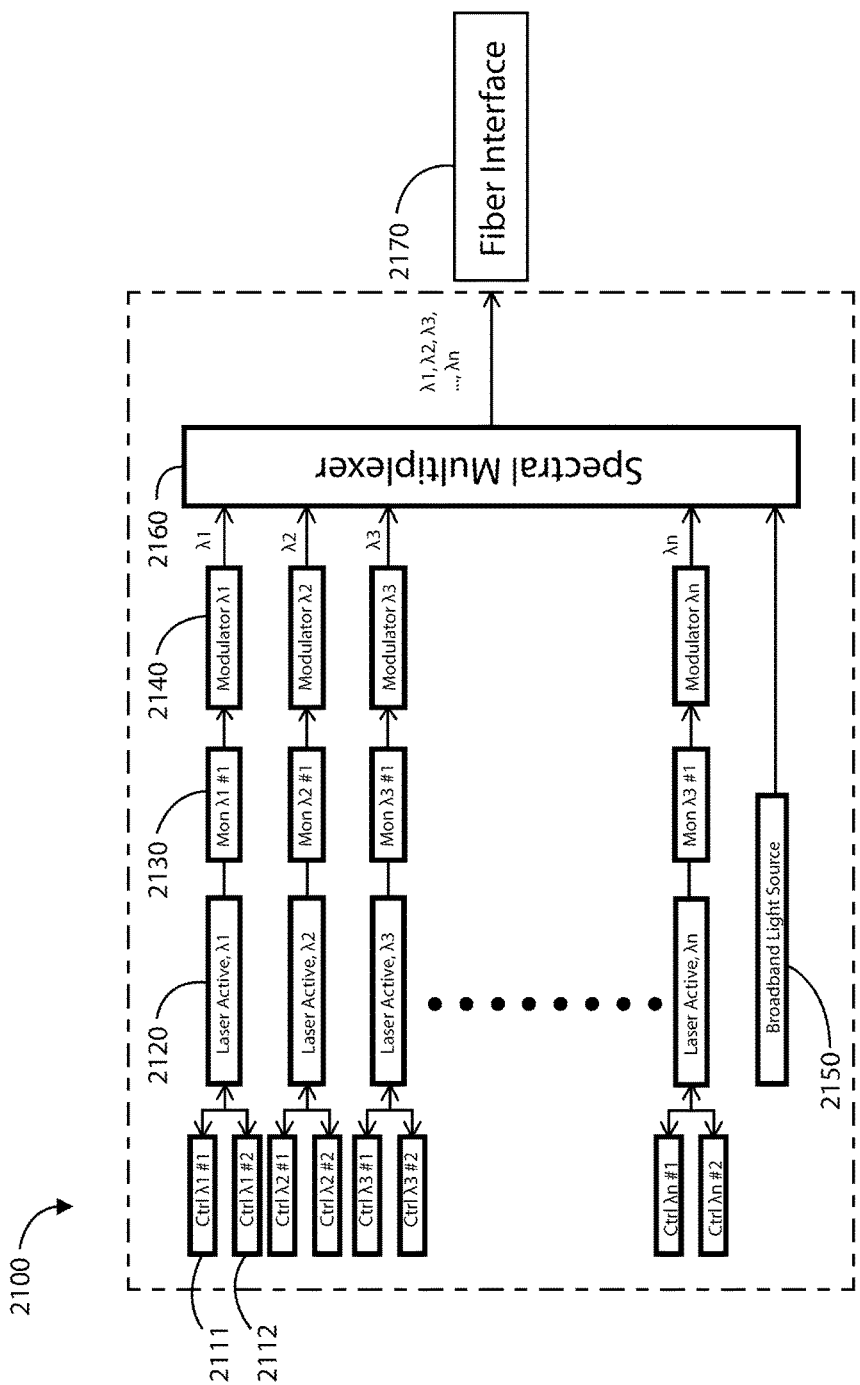
FIG. 21 is a simplified diagram illustrating a laser configuration at a transmitter side of a silicon photonics device according to an embodiment of the present invention.

FIG. 21 is a simplified diagram illustrating a laser configuration at a transmitter side of a silicon photonics device according to an embodiment of the present invention. As shown are a plurality of laser devices 2120 numbered from wavelength 1 to n, each of which has a modulator device 2140, and are collectively coupled to a spectral multiplexer 2160. Each of the laser devices 2120 are coupled to a pair of control blocks, such as blocks 2111 and 2112, and monitor blocks 2130. The spectral multiplexer 2160 is coupled to a fiber interface 2170. As shown is a broad band source 2150, as previously noted.

Figure 22:
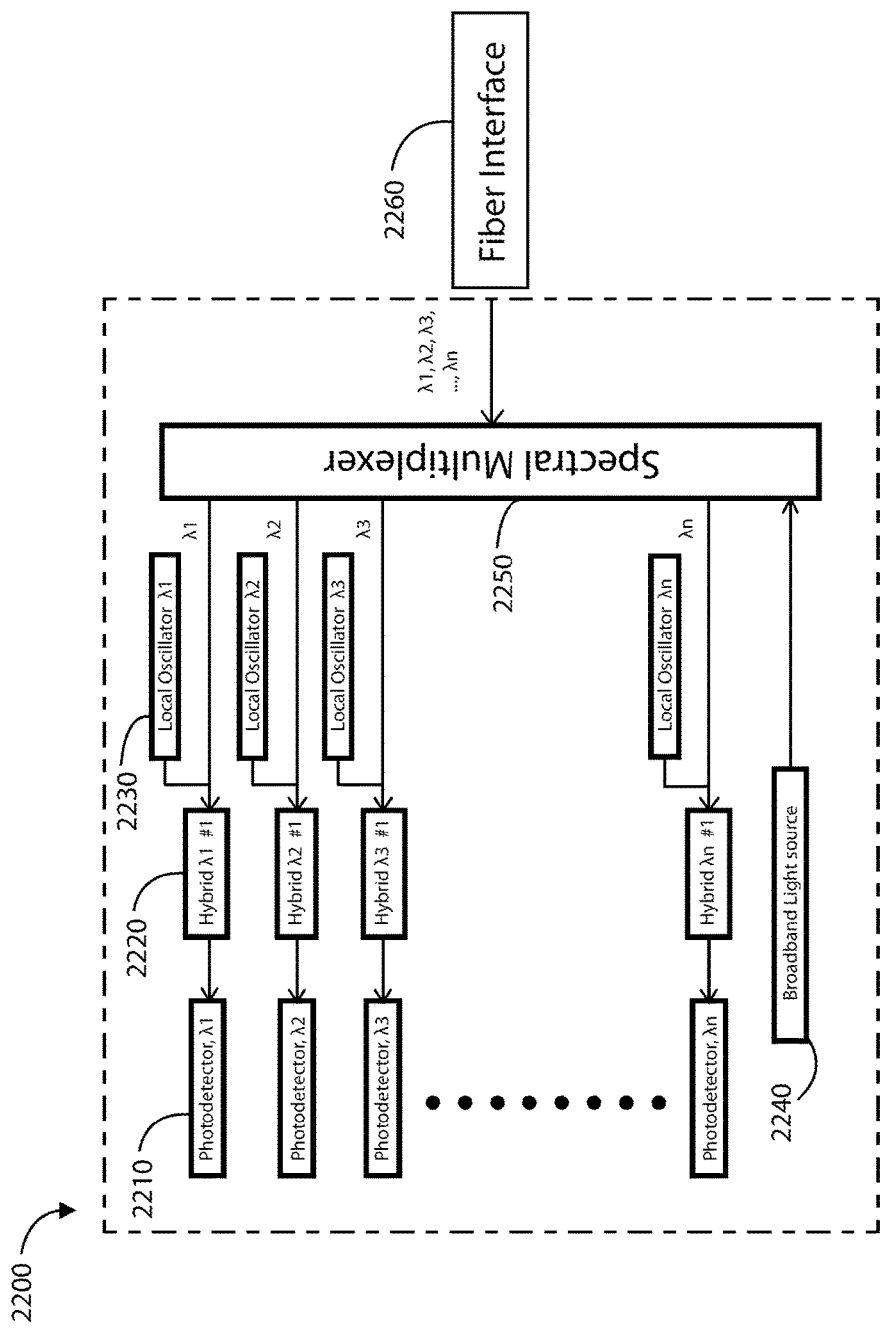
FIG. 22 is a simplified diagram illustrating a laser configuration at a receiver side of a silicon photonics device according to an embodiment of the present invention.

FIG. 22 is a simplified diagram illustrating a laser configuration at a receiver side of a silicon photonics device according to an embodiment of the present invention. As shown are a plurality of detectors 2210 numbered from wavelength 1 to n, each of which has a oscillator device 2230, and are collectively coupled to a spectral multiplexer 2250. Each of the photodetector blocks 2210 can be coupled to hybrid blocks 2220. The spectral multiplexer is coupled to a fiber interface 2260. As shown is a broad band source 2240, as previously noted.

FIG. 23 is a simplified diagram illustrating a hybrid light source for a silicon photonics device according to an embodiment of the present invention. As shown, device 2301 includes a silicon substrate 2310 for photonics devices, and an overlying buried oxide region 2320. Device 2302 includes the same substrate 2310 and buried oxide region 2320, and also includes an overlying crystalline silicon material 2330 configured for a waveguide or guides. Of course, there can be other variations, modifications, and alternatives.

Figure 24:
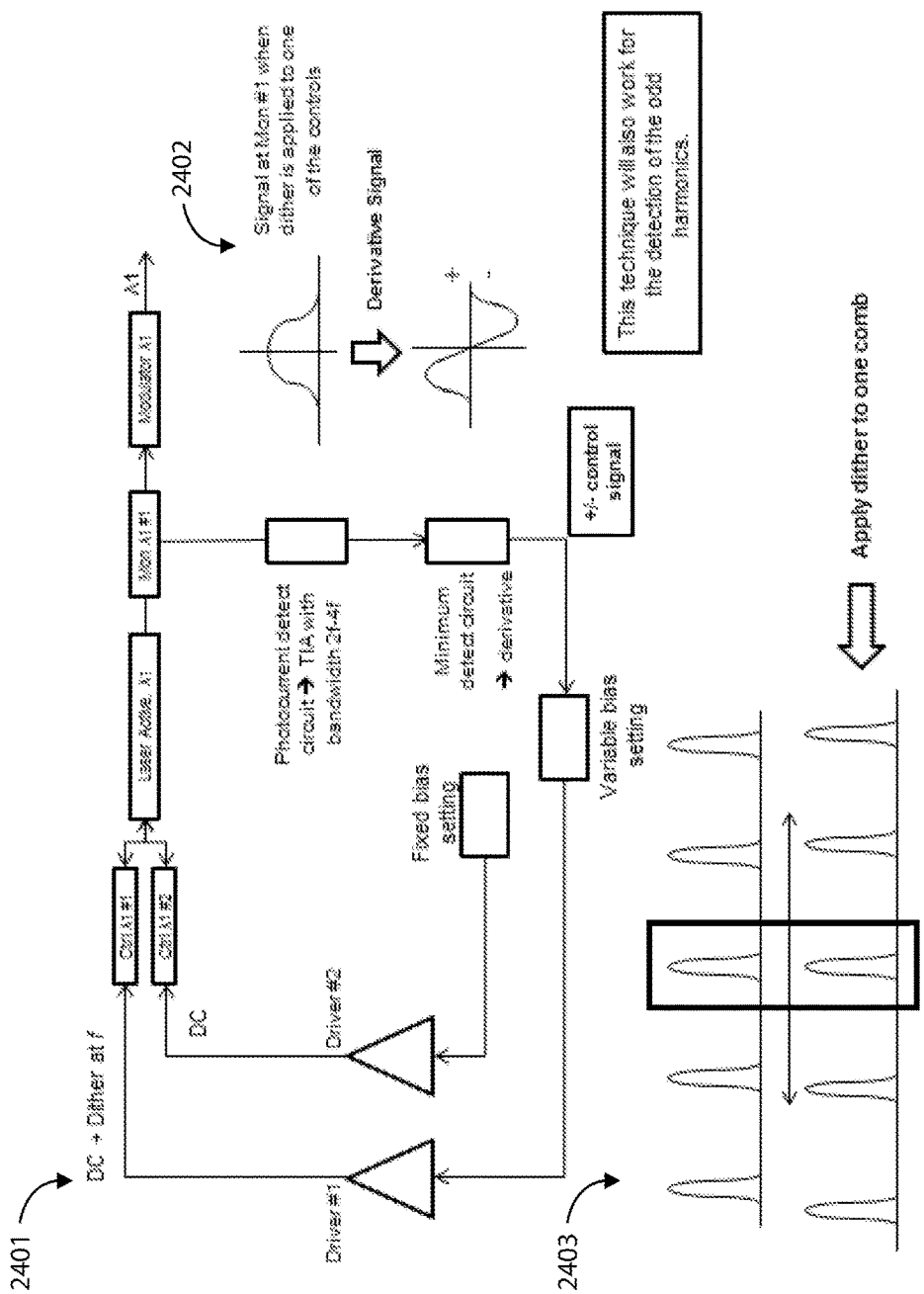
FIG. 24 is a simplified diagram illustrating a wavelength control and locking configuration with a silicon photonic device according to an embodiment of the present invention.

FIG. 24 is a simplified diagram illustrating a wavelength control and locking configuration with a silicon photonic device according to an embodiment of the present invention. As shown, device 2401 shows a laser device coupled to control blocks, and a modulator block. Drivers #1 and #2 are coupled to the control blocks #1 and #2. A fixed bias setting is coupled to driver #2, whereas a variable bias setting is coupled to driver #1. The monitor block coupled to the modular and laser device is also coupled in series to a photocurrent detect circuit to TIA with bandwidth 2f-4f block, where the dither frequency is f, a minimum detect circuit to derivative block, and the variable bias setting block. Graph 2402 shows the signal at the monitor #1 block when dither is applied, showing the derivative signal in the bottom graph. Graph 2403 shows the effect of applying dither to one comb on the wavelengths produced. This self-test configuration can also be used in the detections of the odd harmonics.

Figure 25:
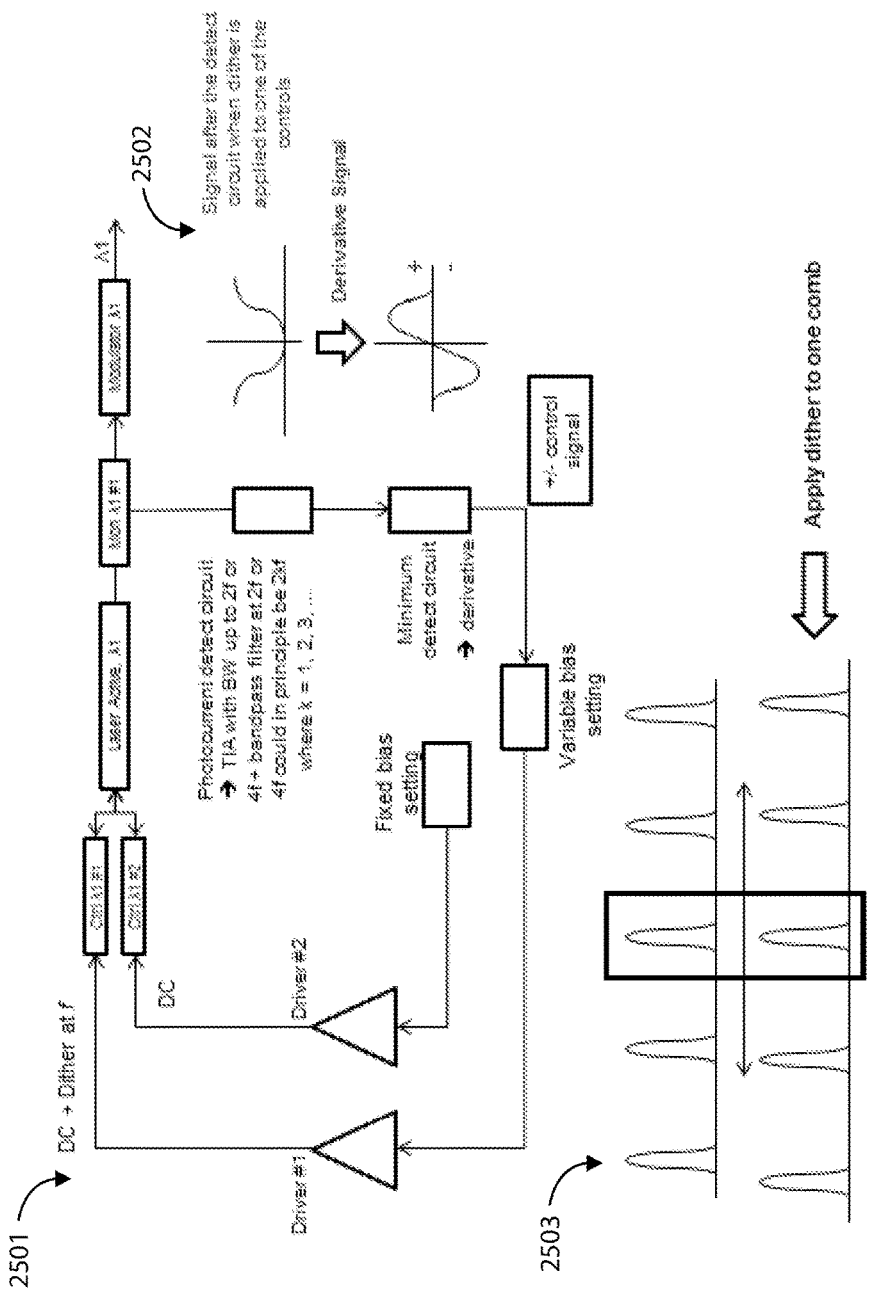
FIG. 25 is a simplified diagram illustrating a wavelength control and locking configuration with a silicon photonics device according to an alternative embodiment of the present invention.

FIG. 25 is a simplified diagram illustrating a wavelength control and locking configuration with a silicon photonics device according to an alternative embodiment of the present invention. The device of 2501 shows a similar configuration to device 2401 of FIG. 24. Here, the photo current detect circuit includes a TIA with BW up to 2f or 4f with a band pass filter at 2f or 4f (which can be 2kf, where k=1, 2, 3, etc.) Graph 2502 shows the signal after the detect circuit when dither is applied to one of the controls. Graph 2503 shows the application of dither to one comb, similar to graph 2403 of FIG. 24.

FIGS. 26 A-C are simplified diagrams illustrating a silicon photonics device configured on high speed substrates according to embodiments of the present invention. FIG. 26A shows device 2601 wherein a high speed ASIC is configured overlying a first region of a high speed substrate and coupled to one or more first contact pads. At least one of the first contacts is coupled to one of one or more second contact pads. Similarly, at least one of the second contacts is coupled to one of one or more third contact pads. A high speed probe is shown at the second contacts.

In an embodiment, the high speed substrate is designed such that it has a series of traces and via connections to characterize its bandwidth and loss. The probe pads may be staggered and/or placed at different distances from the ASIC to characterize the ASIC drive and substrate bandwidth properties. This test can be done in manufacturing to screen out bad ASIC's before the next die is attached. Typically, lower cost dies are screened out before expensive ones. The connections may also be daisy chained on the substrate to test a number of vias and connections in series to extract the equivalent circuit model for each.

FIG. 26B shows device 2602 wherein a silicon photonics device is configured overlying a second region of the high speed substrate. The silicon photonics device is coupled to the one or more second contacts. The high speed ASIC and the silicon photonics device are coupled via the first and second contacts. Here, the high speed probe is shown at the third contacts.

In an embodiment, the BIST (built-in self-test) capability in the silicon photonics chip can be used to convert the optical signal to the electrical equivalent and test it on the high speed substrate. The high speed substrate can also have resistors, capacitors, etc., for terminations and appropriate electrical loads. In the normal use case, the signals from the silicon photonics device will terminate in the high speed ASIC completely in the self-test loop. There are diagnostic cases where external termination may be provided on the substrate and signal quality is verified.

FIG. 26C shoes device 2603 wherein another high speed ASIC is configured overlying a third region of the high speed substrate. This second high speed ASIC is coupled to the one or more third contacts. The second high speed ASIC and the silicon photonics device are coupled via the second and third contacts. High speed electrical ASIC and silicon photonics ASIC can be cascaded for testing and characterization.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A differential EAM (Electro-Absorption Modulator) device, the device comprising:
    a substrate member;
    a differential electrical driver circuit configured on a first application-specific integrated circuit (ASIC) overlying the substrate member to provide a first driver output and a second driver output;
    a silicon photonics device comprising a first EAM module comprising a first laser at a first wavelength electrically coupled to the differential electrical driver circuit to receive the first driver output, the first EAM module including a first output, a monitor block coupled in series to a transimpedance amplifier (TIA), a minimum detect circuit to derivative block, and a variable bias setting block that is coupled to the differential driver circuit, the first EAM module further comprising a second, redundant laser at the first wavelength and coupled to the differential driver circuit;
    a second application-specific integrated circuit (ASIC) coupled to the silicon photonics device through the substrate member;
    a second EAM module electrically coupled to the differential electrical driver circuit to receive the second driver output, the second EAM including a second output complementary to the first output;
    a common mode termination resistor coupled to the first EAM module and the second EAM module;
    a beam splitter module operably splitting a single input signal into a first portion coupled to the first EAM module and a second portion coupled to the second EAM module;
    a bias circuit electrically coupled to the first EAM module and the second EAM module; and
    a self-test block featuring a broadband source and configured to provide a built-in self-test (BIST) electrical equivalent output to an external spectrum analyzer via a separate high-speed substrate that includes a termination.

2. The device of claim 1 wherein the second output configured as a monitor or is terminated.

3. The device of claim 1 further comprising a common mode voltage node coupled between the first EAM module and the second EAM module, wherein the first EAM module and the second EAM module are configured as a matched pair.

4. The device of claim 3 wherein the first EAM module and the second EAM module are configured with characteristics within a match range of −25% to +25%.

5. The device of claim 1 wherein the first output or the second output is characterized by a frequency range between 10 GHz-50 GHz and a wavelength ($\lambda$) range between 1200 nm-1650 nm.

6. The device of claim 1 wherein the first output or the second output is characterized by a data rate of greater than 10 Gbit/s.

7. The device of claim 1 wherein the TIA has a bandwidth of 2f-4f with f being a dither frequency.

8. The device of claim 1 further comprising a bandpass filter.

9. The device of claim 8 wherein the TIA has a bandwidth up to 2f or 4f with f being a dither frequency.

10. The device of claim 9 wherein the bandpass filter is at 2kf with k being a positive integer.

11. A multiple differential EAM (Electro-Absorption Modulator) device, the device comprising:
- a substrate member;
- at least two differential EAM modules comprising:
  - a differential electrical driver circuit configured on a first application-specific integrated circuit (ASIC) overlying the substrate member, the differential electrical driver circuit having a first driver output and a second driver output;
  - a silicon photonics device comprising a first EAM module comprising a first laser at a first wavelength electrically coupled to the first driver output of the differential electrical driver circuit, the first EAM module having a first output, a monitor block coupled in series to a transimpedance amplifier (TIA), a minimum detect circuit to derivative block, and a variable bias setting block that is coupled to the differential driver circuit, the first EAM module further comprising a second, redundant laser at the first wavelength and coupled to the differential driver circuit;
- a second application-specific integrated circuit (ASIC) coupled to the silicon photonics device through the substrate member;
- a second EAM module electrically coupled to the second driver output of the differential electrical driver circuit, the second EAM module having a second output complementary to the first output;
- a common mode termination resistor coupled to the first EAM module and the second EAM module;
- a beam splitter module operably splitting a single input signal into a first portion coupled to the first EAM module and a second portion coupled to the second EAM module;
- a bias circuit electrically coupled to the first EAM module and the second EAM module; and
- a self-test block featuring a broadband source and configured to provide a built-in self-test (BIST) electrical equivalent output to an external spectrum analyzer via a separate high-speed substrate that includes a termination.

12. The device of claim 11 wherein the second output configured as a monitor or is terminated.

13. The device of claim 11 further comprising a common mode voltage node coupled between the first EAM module and the second EAM module, wherein the first EAM module and the second EAM module are configured as a matched pair.

14. The device of claim 13 wherein the first EAM module and the second EAM module are configured with characteristics within a match range of −25% to +25%.

15. The device of claim 11 wherein the first output or the second output is characterized by a frequency range between 10 GHz-50 GH, a wavelength ($\lambda$) range between 1200 nm-1650 nm, and a data rate of greater than 10 Gbit/s.

16. The device of claim 15 wherein the first output or the second output of at least one of the differential EAM modules is characterized by a wavelength ($\lambda$) range between 1200 nm-1400 nm, and wherein the first output or the second output of at least one of the differential EAM modules is characterized by a wavelength ($\lambda$) range between 1500 nm-1650 nm.

17. The device of claim 11 wherein the TIA has a bandwidth of 2f-4f with f being a dither frequency.

18. The device of claim 11 further comprising a bandpass filter.

19. The device of claim 18 wherein the TIA has a bandwidth up to 2f or 4f with f being a dither frequency.

20. The device of claim 19 wherein the bandpass filter is at 2kf with k being a positive integer.

* * * * *